United States Patent
Mochizuki et al.

(10) Patent No.: US 7,809,979 B2
(45) Date of Patent: Oct. 5, 2010

(54) STORAGE CONTROL APPARATUS AND METHOD

(75) Inventors: Shinya Mochizuki, Kawasaki (JP); Mikio Ito, Kawasaki (JP); Hidejiro Daikokuya, Kawasaki (JP); Kazuhiko Ikeuchi, Kawasaki (JP); Hideo Takahashi, Kawasaki (JP); Yoshihito Konta, Kawasaki (JP); Yasutake Sato, Kawasaki (JP); Hiroaki Ochi, Kawasaki (JP); Tsukasa Makino, Kawasaki (JP); Norihide Kubota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 770 days.

(21) Appl. No.: 11/237,657

(22) Filed: Sep. 29, 2005

(65) Prior Publication Data

US 2006/0212748 A1 Sep. 21, 2006

(30) Foreign Application Priority Data

Mar. 15, 2005 (JP) .............................. 2005-073669

(51) Int. Cl.
*G06F 11/00* (2006.01)

(52) U.S. Cl. .............................................. 714/6; 714/5

(58) Field of Classification Search ...................... 714/6
See application file for complete search history.

(56) References Cited

U.S. PATENT DOCUMENTS

| | | | | |
|---|---|---|---|---|
| 5,271,012 A * | 12/1993 | Blaum et al. | ..................... | 714/6 |
| 5,572,659 A * | 11/1996 | Iwasa et al. | ..................... | 714/6 |
| 5,579,475 A * | 11/1996 | Blaum et al. | ..................... | 714/7 |
| 5,666,512 A * | 9/1997 | Nelson et al. | ................ | 711/114 |
| 6,353,895 B1 | 3/2002 | Stephenson | | |
| 6,516,425 B1 | 2/2003 | Belhadj et al. | | |
| 6,647,514 B1 | 11/2003 | Umberger et al. | | |
| 6,952,794 B2 * | 10/2005 | Lu | .................. | 714/7 |
| 7,103,796 B1 * | 9/2006 | Kekre et al. | ..................... | 714/6 |
| 7,249,277 B2 * | 7/2007 | Arai et al. | ....................... | 714/6 |
| 2003/0018864 A1 | 1/2003 | Ikeuchi et al. | | |
| 2003/0088803 A1 * | 5/2003 | Arnott et al. | .................... | 714/5 |
| 2003/0120863 A1 | 6/2003 | Lee et al. | | |

(Continued)

FOREIGN PATENT DOCUMENTS

EP 1 343 087 9/2003

(Continued)

OTHER PUBLICATIONS

John R. Douceur, titled "Progress-based regulation of low-importance processes" published Dec. 1999 pp. 247-260.*

(Continued)

*Primary Examiner*—Scott T Baderman
*Assistant Examiner*—Kamini Patel
(74) *Attorney, Agent, or Firm*—Staas & Halsey LLP

(57) ABSTRACT

In a system for dispersively storing data and parity in a plurality of storage devices, information in a first storage device is restored by using information stored in the storage devices other than the first storage device when the first storage device fails. And information in a non-restored area in the first storage device and information in a second storage device are restored by using information stored in the storage devices other than the first and the second storage devices when the second storage device fails while the information in the first storage device is being restored.

11 Claims, 25 Drawing Sheets

U.S. PATENT DOCUMENTS

| | | | |
|---|---|---|---|
| 2005/0193239 A1* | 9/2005 | Shackelford | 714/7 |
| 2005/0210318 A1* | 9/2005 | Marks et al. | 714/7 |
| 2007/0067666 A1* | 3/2007 | Ishikawa et al. | 714/6 |

FOREIGN PATENT DOCUMENTS

| | | |
|---|---|---|
| JP | A-H03-240123 | 10/1991 |
| JP | A-H07-28710 | 1/1995 |
| JP | 09-146850 | 6/1997 |
| JP | 2000-259359 | 9/2000 |
| JP | 2001-147785 | 5/2001 |
| JP | 2001-290746 | 10/2001 |
| JP | 2002-123372 | 4/2002 |
| JP | 2003-85019 | 3/2003 |
| JP | 2003-233468 | 8/2003 |
| JP | 2003-233469 | 8/2003 |
| JP | 2004-30577 | 1/2004 |
| JP | 2004-164675 | 6/2004 |

OTHER PUBLICATIONS

Korean Notice of Rejection Grounds dated Oct. 26, 2006 in corresponding Korean patent application 10-2005-65647.

Japanese Office Action issued on Jun. 16, 2009 in corresponding Japanese Patent Application 2005-073669.

* cited by examiner

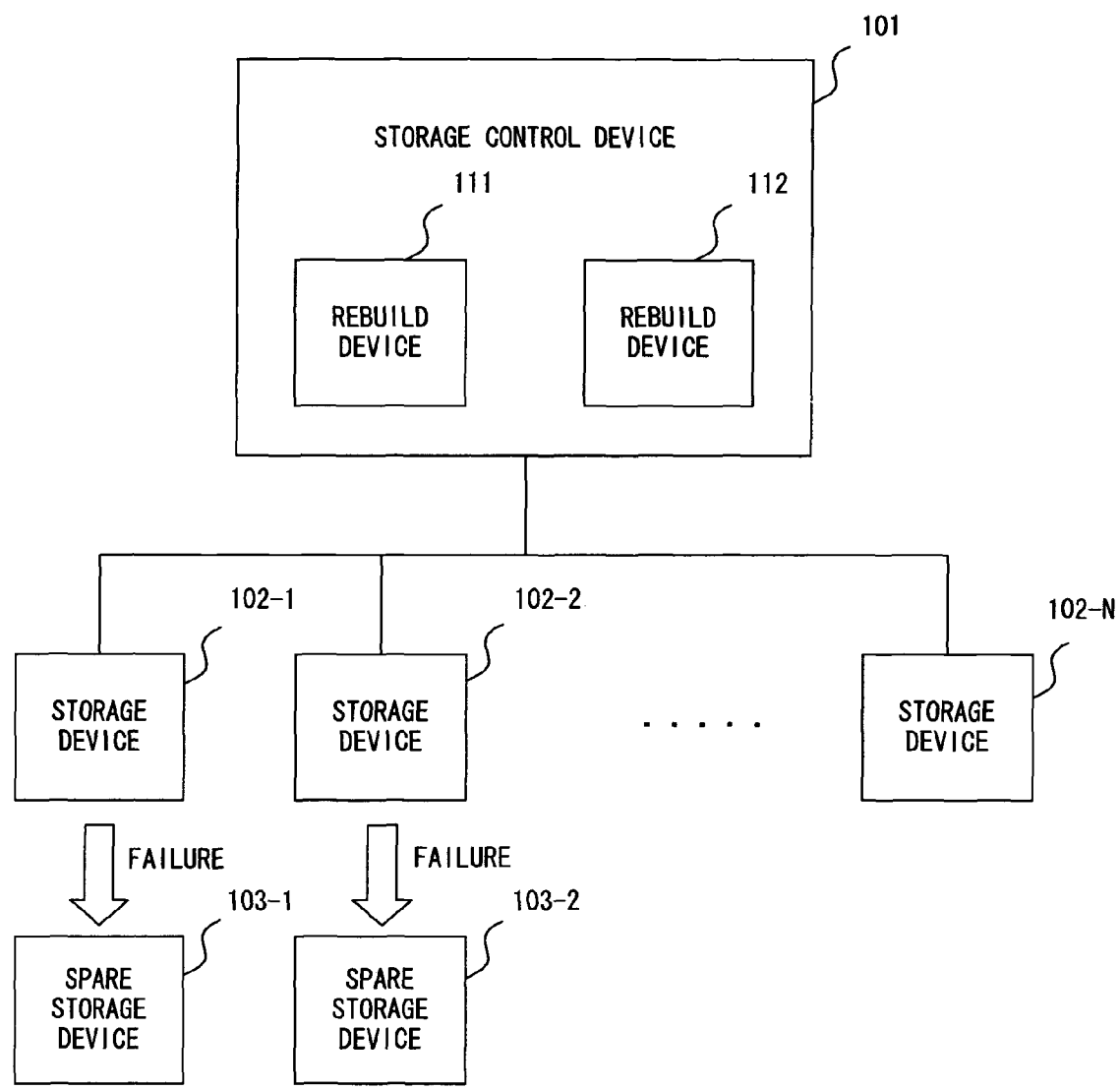
F I G. 2 A

| | SCHEME | METHOD OF MANAGING PROGRESS | MAN-HOUR/DIFFICULTY |
|---|---|---|---|
| 1 | SCHEME OF SEPARATE EXECUTION | SAME AS IN CONVENTIONAL TECHNIQUE | EASY |
| 2 | SCHEME OF WAITING FOR CORRESPONDENCE OF PROGRES POSITIONS | SAME AS IN CONVENTIONAL TECHNIQUE | EASY |
| 3 | COMBINING SCHEME | SAME AS IN CONVENTIONAL TECHNIQUE | INTERMEDIATE |
| 4 | SCHEME IN WHICH DUPLICATELY FAILING AREAS ARE PRIORLY RESTORED | MANAGEMENT OF RESTORATION COMPLETION POSITION IN ADDITION TO CONVENTIONAL TECHNIQUE | INFLUENCE ON NORMAL OPERATIONS |
| 5 | SCHEME IN WHICH RESTORATION FOR DUPLICATELY FAILING AREAS AND RESTORATION USING RESTORED HOT SPARE HS ARE PARALLELLY EXECUTED | MANAGEMENT OF RESTORATION COMPLETION POSITION IN ADDITION TO CONVENTIONAL TECHNIQUE | |
| 6 | SCHEME OF RANDOM RESTORATION | MANAGEMENT OF BITMAP | MORE MAN-HOUR AND INFLUENCE ON NORMAL OPERATIONS |

F I G. 3

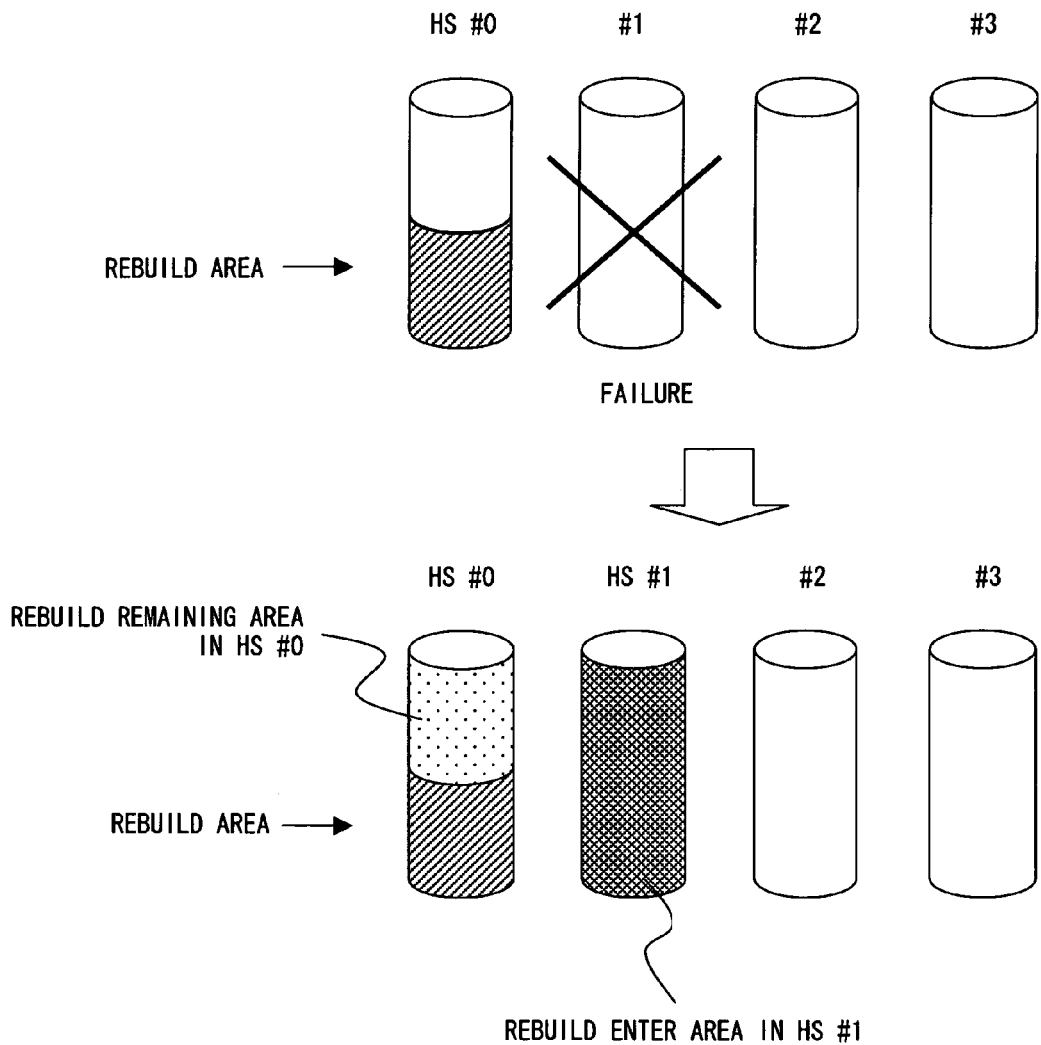
F I G. 4

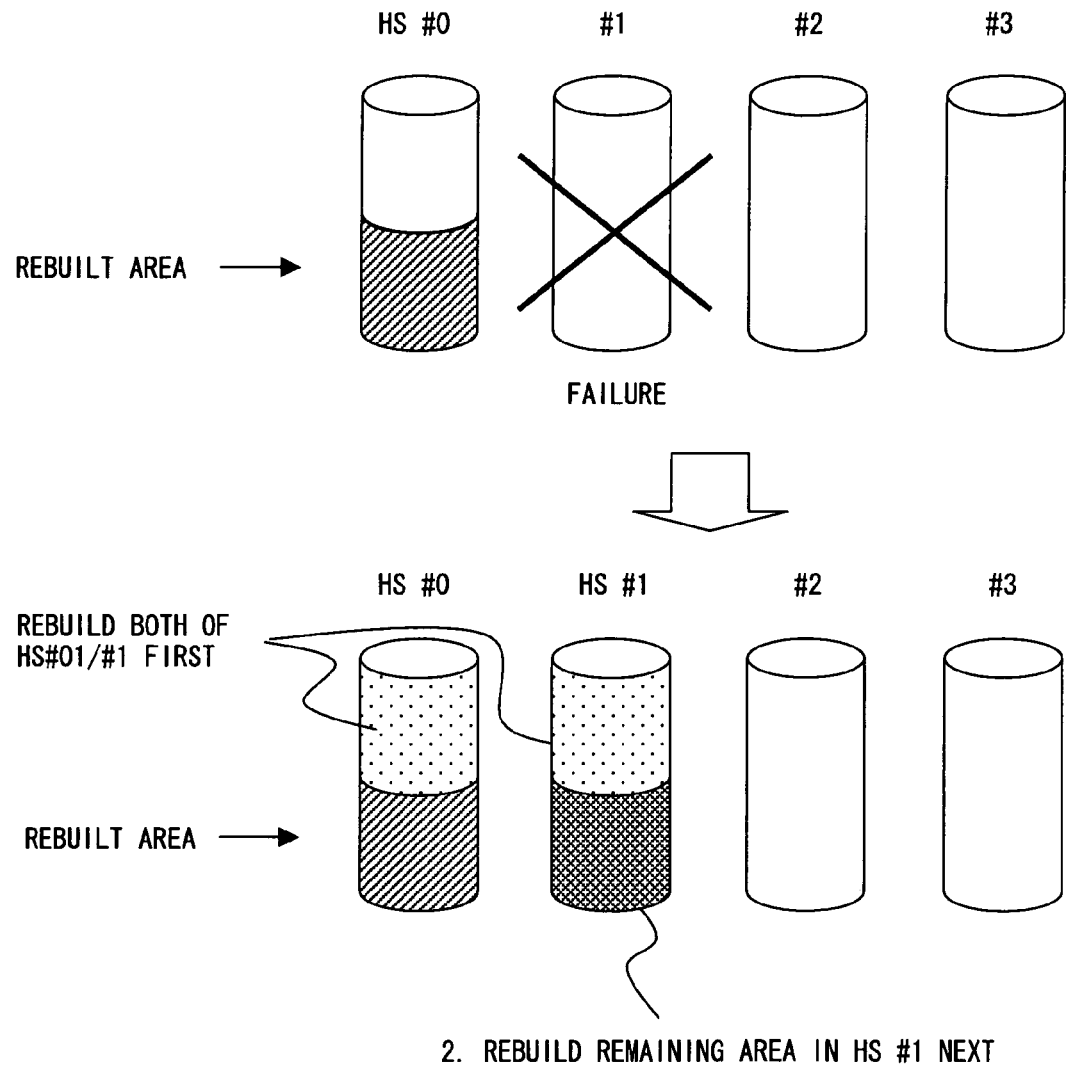
F I G. 6

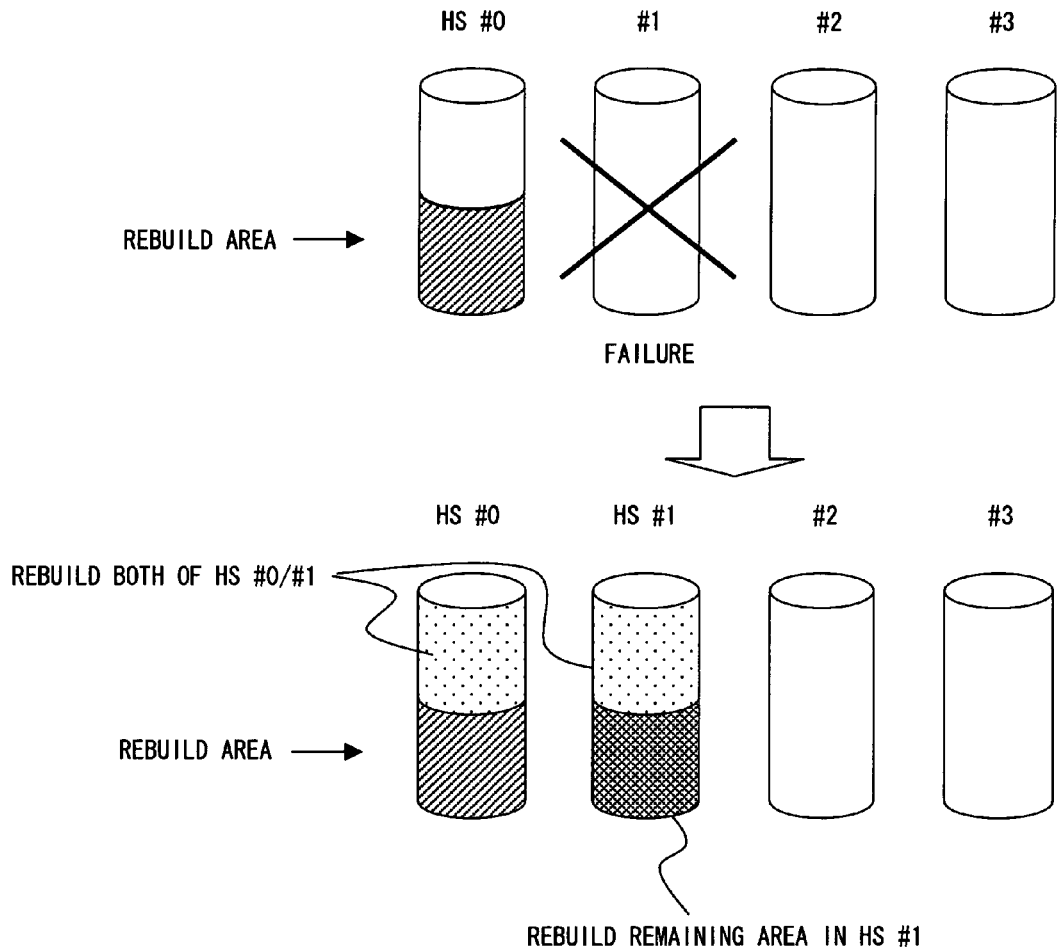
F I G. 7

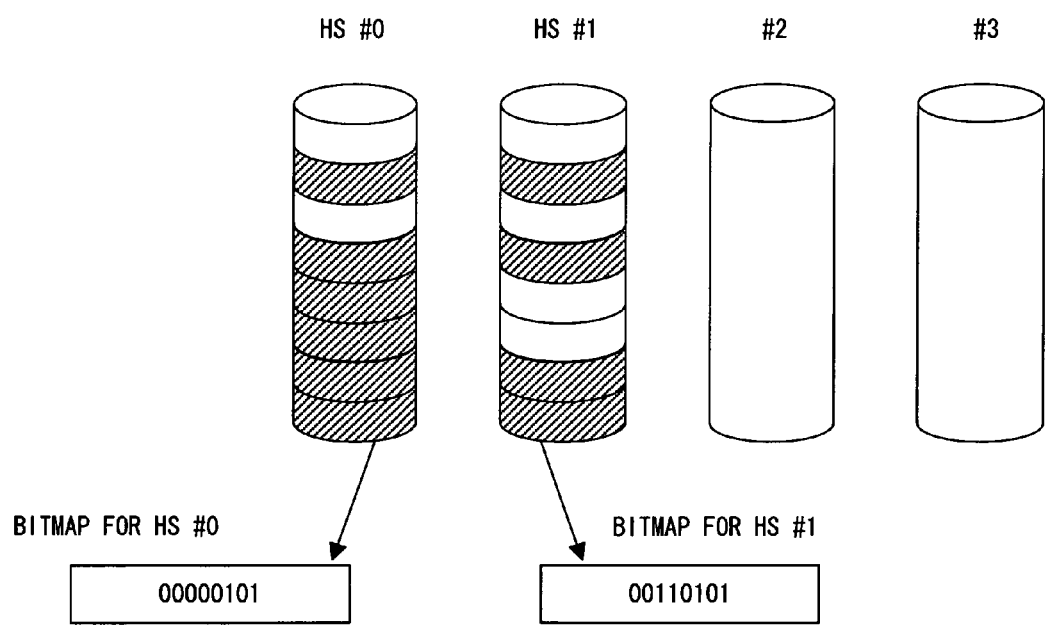
F I G. 8

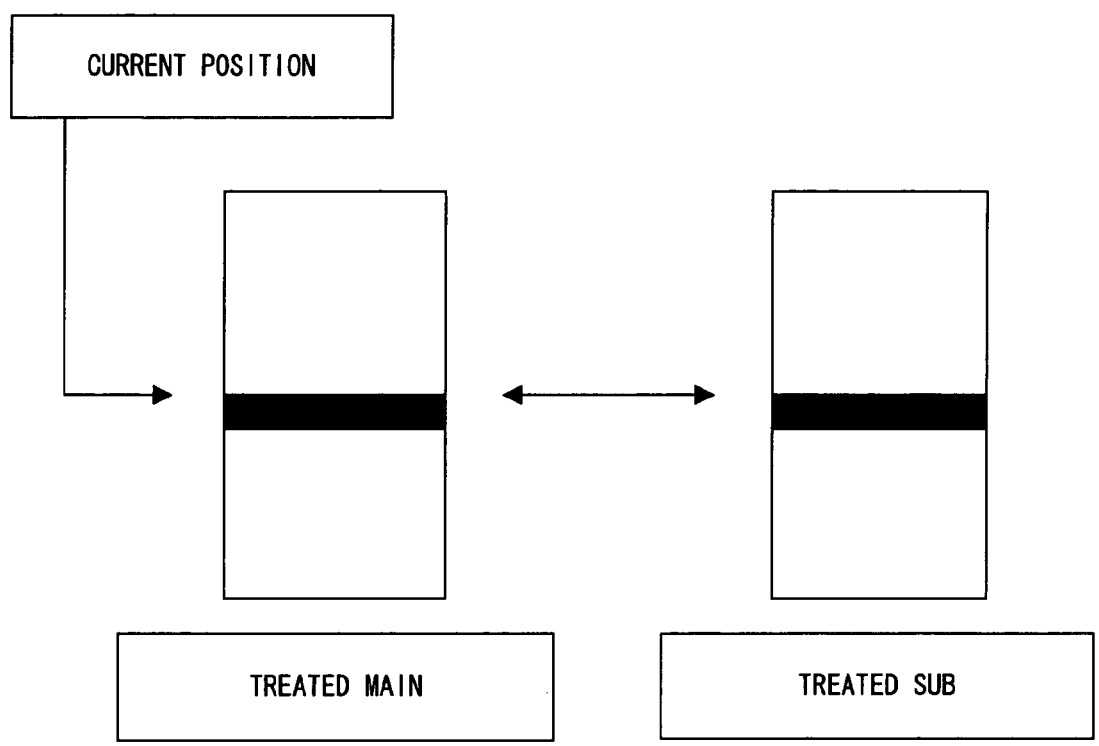
F I G. 9

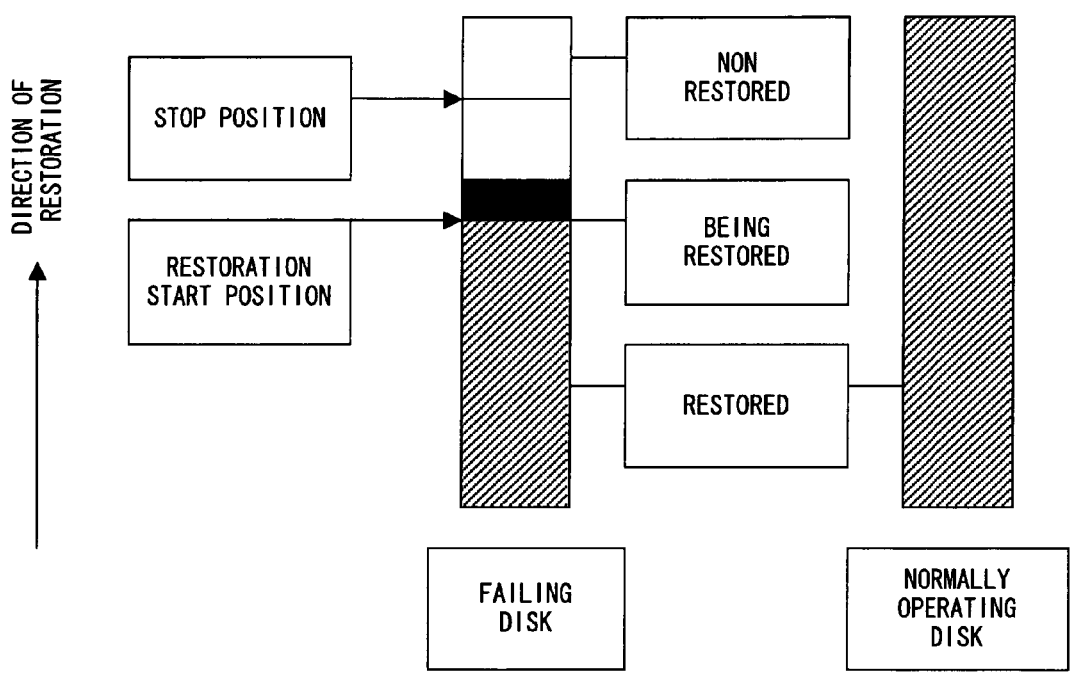
F I G. 10

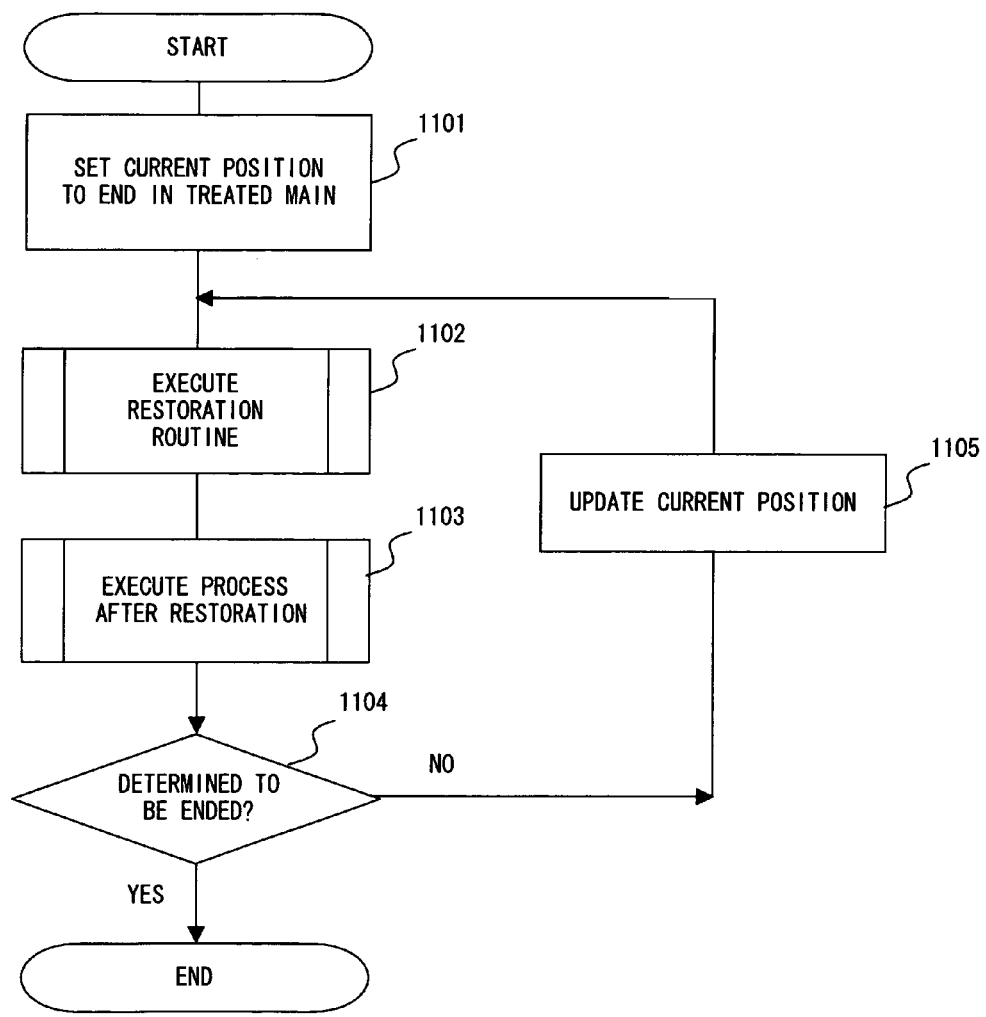
F I G. 1 1

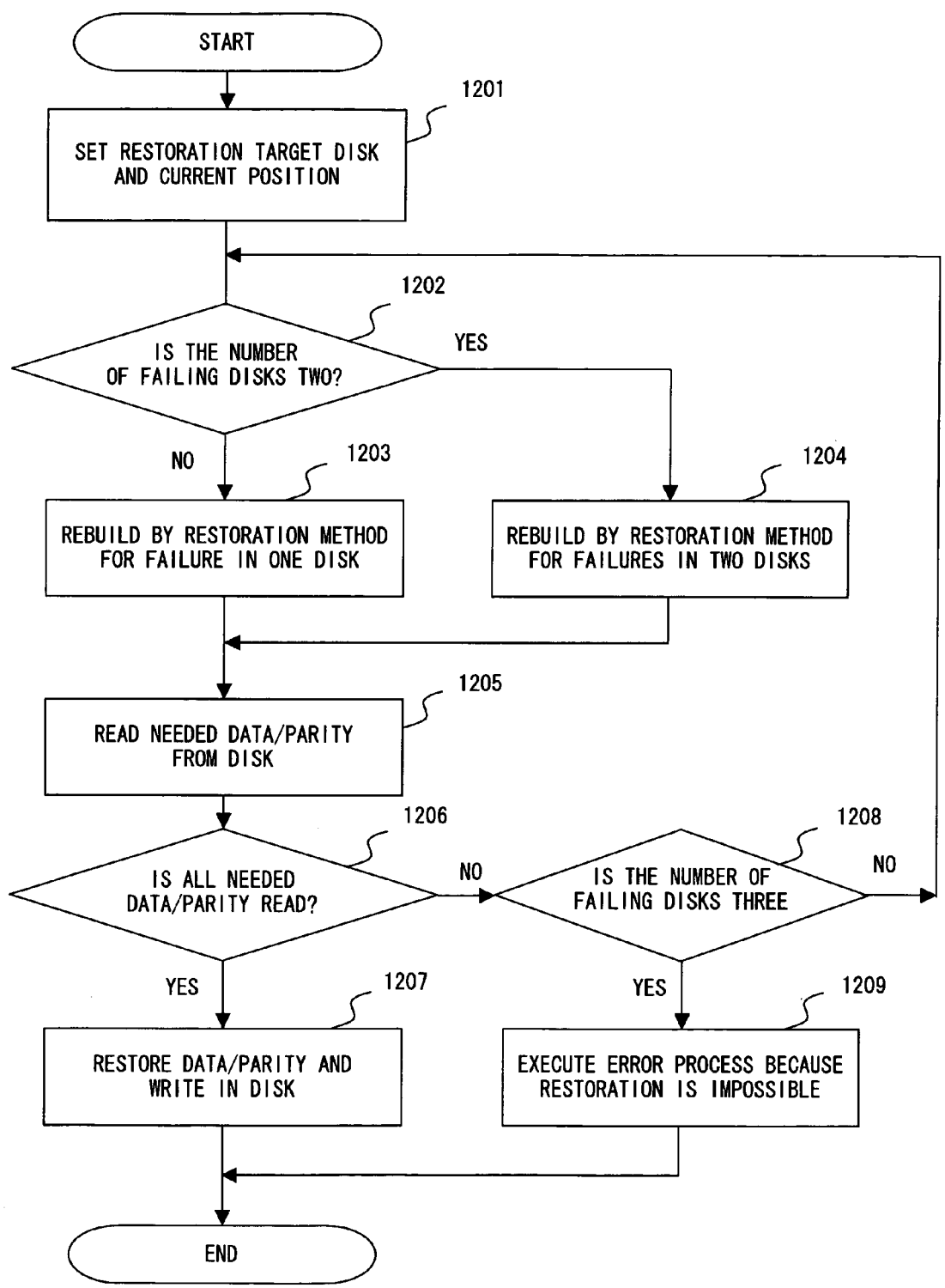
F I G. 1 2

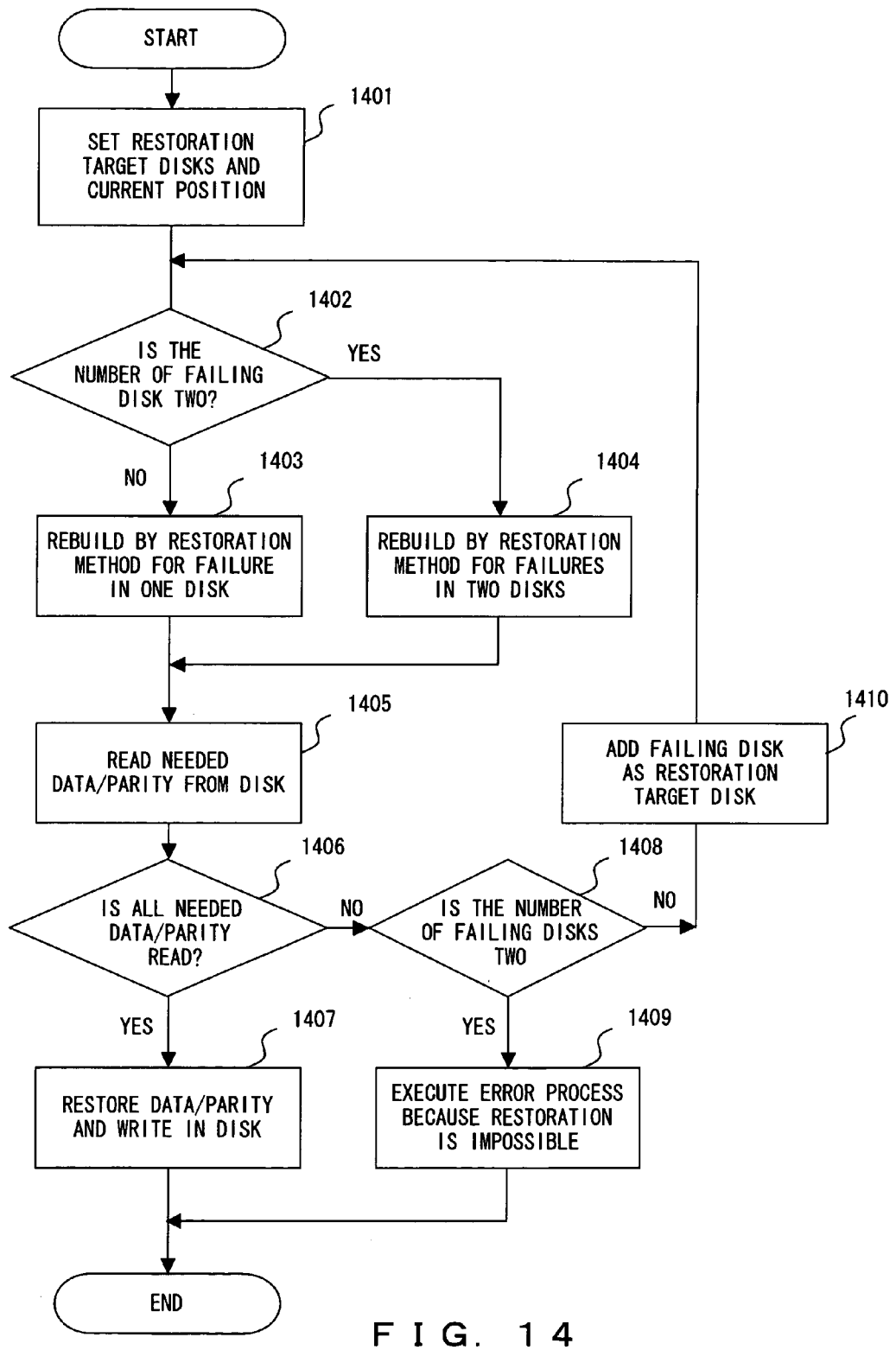
F I G. 1 4

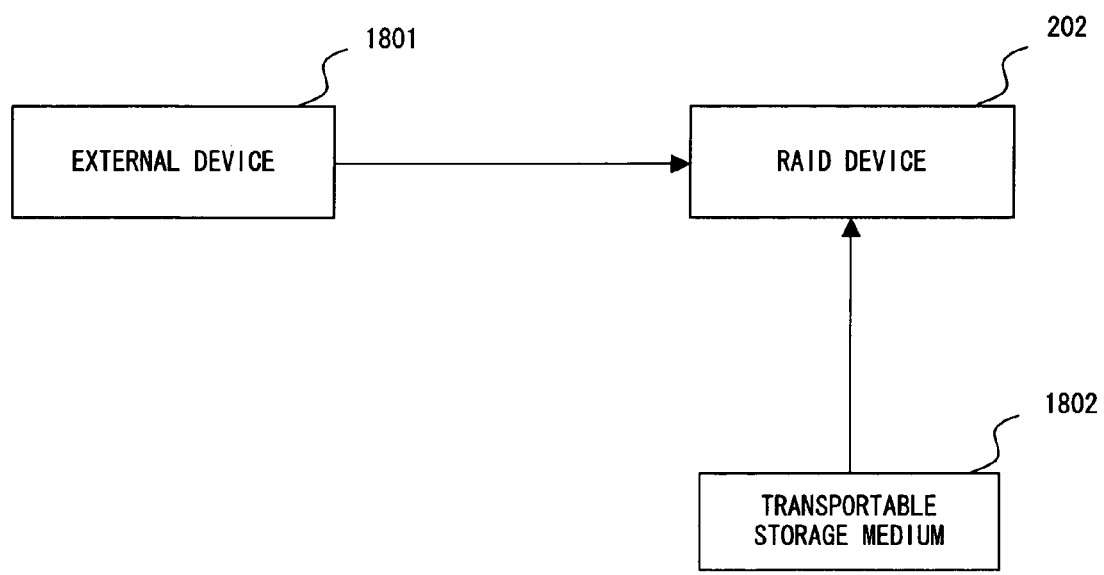
F I G. 2 0

STORAGE CONTROL APPARATUS AND METHOD

BACKGROUND OF THE INVENTION

1. Field of the Invention

The present invention relates to a storage control apparatus and a method in which data and parity are dispersively stored in a plurality of storage devices such as RAID (Redundant Array of Inexpensive Disks) and a rebuild process for the data and the parity is executed in the case of the failure of the storage device.

2. Description of the Related Art

The above RAID is a technique in which a plurality of hard disks are combined and are managed as one hard disk with a redundancy. And the RAID can be classified into seven levels from RAID 0 to RAID 6 in accordance with the method of assignment of data to disks and the method of realizing the redundancy of data. Among the seven levels of RAID, in RAID 3 to RAID 6, the redundancy is realized by storing the parity generated based on the data is stored separately from the data. In the case of the failure of the disk, a rebuild process is executed in order to restore the data in the failing disk by using the parity (See Japanese Patent Application Publication No. 03-240123, for example).

The RAID 6 is the level of RAID which mitigates the failures in two disks. In the RAID 6, two parities P and Q of different types are dispersively stored in different disks respectively, and different methods of restoration are employed in the rebuild processes respectively for the failure in one disk and the failures in two disks.

For example, when data D0 is lost due to a failure in a disk 10 in a RAID device consisting of five disks of disks 10 to 14 as shown in FIG. 1A, the rebuild process for the failure in one disk is executed by using a hot spare 15 which is a spare disk. Upon this, the data D0 is restored based on data D1, D2 and parity P stored in other disks 11 to 13.

To the contrary to above, when data D0 and D1 are lost due to the failures in disks 10 and 11 as shown in FIG. 1B, a rebuild process for the failures in two disks is executed by using hot spares 15 and 16. Upon this, the data D0 and D1 are restored based on data D2 and parities P and Q stored in other disks 12 to 14.

Generally in RAID 6, for each striping, the different kinds of information are stored in the failing disk and the different kinds of information are required for restoration of the information stored in the failing disk, because different disks store the data and the parity for each striping. Accordingly, in the explanation below, the information stored in each disk is referred to as data/parity.

When the situation with the failure in one disk changes into the situation with the failures in two disks, also the rebuild process has to be switched from the rebuild process for the failure in one disk to the rebuild process for the failures in two disks. For example, when a second disk #1 fails while the rebuild process for the failure in one disk is being executed in which the firstly failing disk #0 is replaced by a hot spare (HS) as shown in FIG. 1C, the data/parity can not be restored by the above rebuild process for the failure in one disk. Accordingly, it is usually designed that the rebuild process for the failures in two disks starts by using hot spares HS #0 and HS #1 after stopping the rebuild process for the failure in one disk.

The above described rebuild process for the failures in two disks has the problems below.

In the rebuild process for the failures in two disks shown in FIG. 1C, the restored data/parity already stored in the rebuilt are of the hot spare HS #0 is discarded, and the rebuild process is again executed from the beginning. Accordingly, the restored data/parity is not utilized effectively.

Also, the rebuild process for the failures in two disks which requires greater cost than the rebuild process for the failure in one disk is executed on the entire area of the hot spares HS #0 and HS #1 so that longer time is needed for the restoration of the redundancy.

SUMMARY OF THE INVENTION

It is an object of the present invention to efficiently restore a redundancy by improving a rebuild process for the case where two storage devices fail for storing data/parity, in a storage apparatus such as RAID in which redundancy of data is realized by using parity.

The storage control apparatus according to the present invention comprises a first rebuild device and a second rebuild device, and realizes the redundancy of data by conducting a control by which data and parity are dispersively stored in a plurality of storage devices.

The first rebuild device restores information in a first storage device by using information stored in the storage devices other than the first storage device, and writes the restored information in a first spare storage device, when the first storage fails. The second rebuild device restores information in a non-restored area in the first storage device and information in a second storage device by using information stored in the storage devices other than the first and the second storage devices, and respectively writes the restored information in a corresponding area in the first spare storage device and in a second spare storage device, when the second storage device fails while the information in the first storage device is being restored.

BRIEF DESCRIPTION OF THE DRAWINGS

FIG. 2A shows a principle of a storage control apparatus according to the present invention;

FIG. 3 shows counter schemes for the rebuild processes;

FIG. 4 shows a counter scheme 1;

FIG. 6 shows a counter scheme 4;

FIG. 7 shows a counter scheme 5;

FIG. 8 shows a counter scheme 6;

FIG. 9 shows current positions in a treated Main and a treated Sub;

FIG. 10 shows restoration statuses in each disk;

FIG. 11 is a flowchart of the rebuild process;

FIG. 12 is a flowchart of a restoration routine in the counter scheme 1;

FIG. 14 is a flowchart of the restoration routine in the counter schemes 2 to 5;

FIG. 20 shows a method of providing program and data;

DESCRIPTION OF THE PREFERRED EMBODIMENTS

Figure 1A:
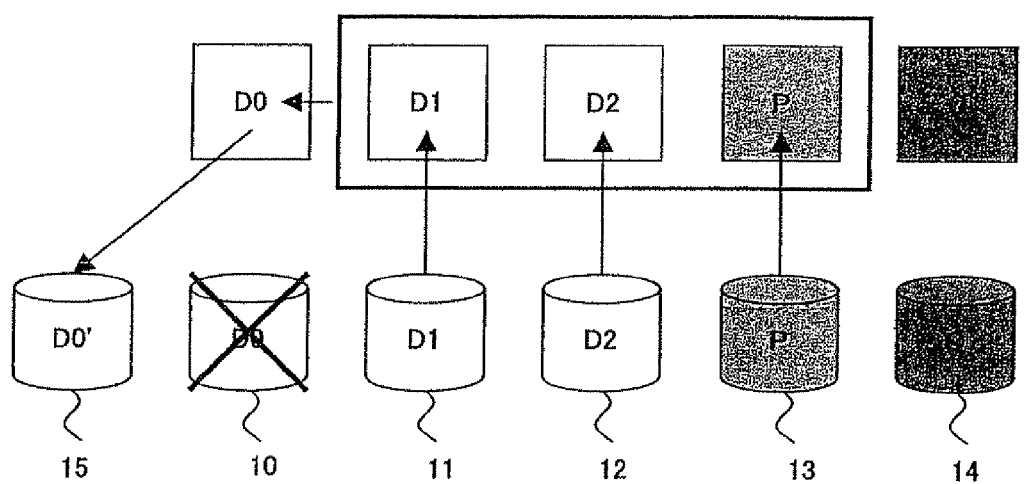
FIG. 1A shows a restoration of data with a failure in one disk.
Figure 1B:
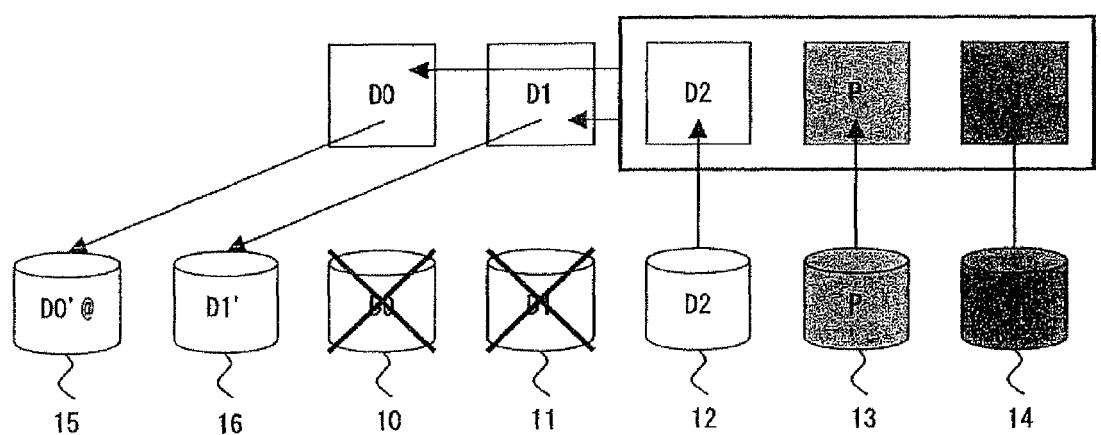
FIG. 1B shows a restoration of data with failures in two disks.
Figure 1:
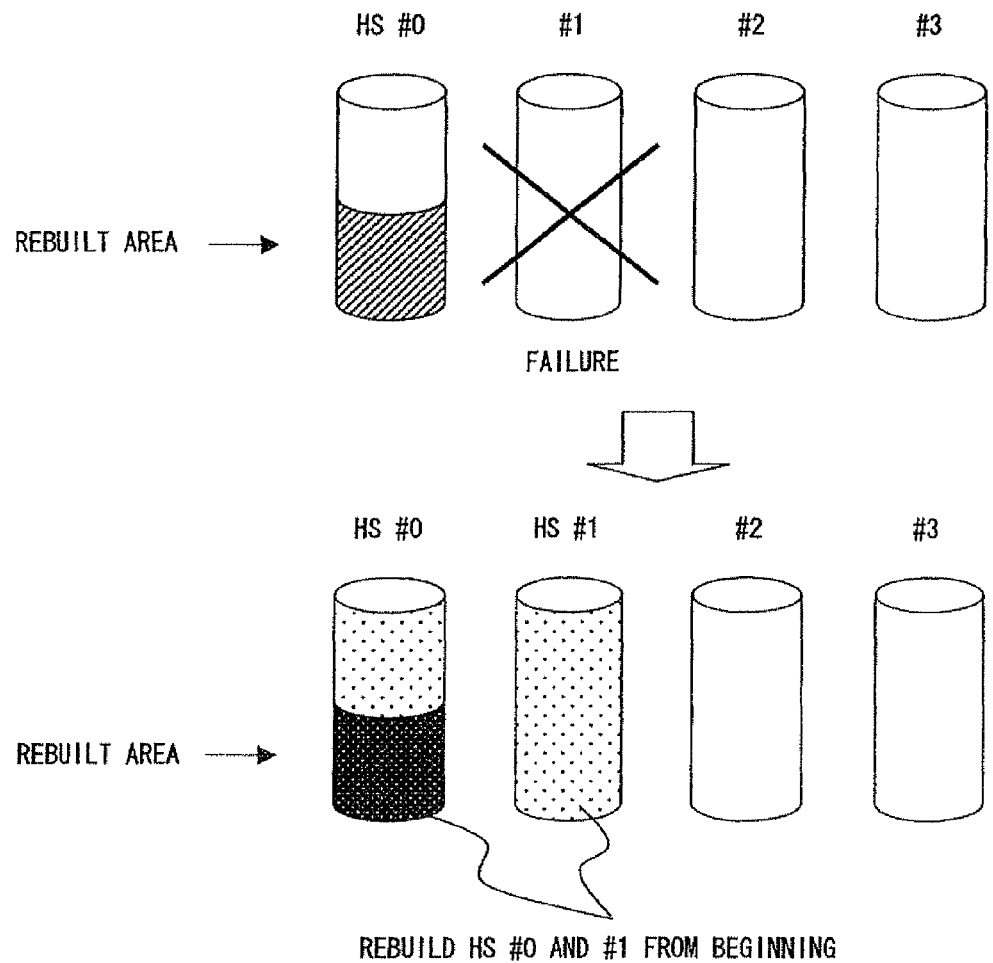
FIG. 1C shows a rebuild process for the failures in two disks.

Hereinafter, the preferred embodiments of the present invention will be explained in detail, with references to the drawings.

FIG. 2A shows a principle of a storage control apparatus according to the present invention. A storage control apparatus 101 in FIG. 2A comprises rebuild devices 111 and 112, and realizes a redundancy of data by executing a control by which data and parity are dispersively stored in a plurality of storage devices 102-1 to 102-N.

The rebuild device 111 restores information in the storage device 102-1 by using information stored in storage devices other than the storage device 102-1, and writes the restored information in a spare storage device 103-1, when the storage device 102-1 fails. The rebuild device 112 restores information stored in a non-restored area in the storage device 102-1 and information in the storage device 102-2 by using information stored in storage devices other than the storage devices 102-1 and 102-2, and writes the restored information respectively in the corresponding area in the spare storage device 103-1 and a spare storage device 103-2 when the storage device 102-2 fails while the information in the storage device 102-1 is being restored.

In each storage device, the data or the parity is stored as information. The information in the failing storage device is restored by using the information stored in normally operating storage devices which have no failure at the moment, and the restored information is written in a spare storage device corresponding to the failing storage device. When the storage device 102-2 fails while the information in the storage device 102-1 is being restored, the information in the restored area in the storage device 102-1 is stored in the spare storage device 103-1 as it is, and the restoration process is executed for the non-restored area in the storage device 102-1 and the entire area in the storage device 102-2.

According to the rebuild control as above, even when the situation with the failure in one disk is changed to the situation with the failures in two disks, the information which is already restored can be effectively utilized without being erased. Also, the restored area in the storage device 102-1 is not included as the target of the restoration, the time consumed for the rebuild process is reduced. Further, regarding the area in the storage device 102-2 which corresponds to the restored area in the storage device 102-1, a rebuild process for the failure in one disk which requires a smaller process cost can be applied so that a higher efficiency is realized.

The storage control apparatus 101 corresponds to, for example, a controller 211 in FIG. 2B, a host bus adapter 1911 in FIG. 21 or a host device 2001 in FIG. 22 which will be later explained.

According to the present invention, in a storage apparatus for dispersively storing the data and the parity in a plurality of the storage devices, a rebuild process when two storage devices fail is improved and the redundancy of data is efficiently restored.

Figure 2B:
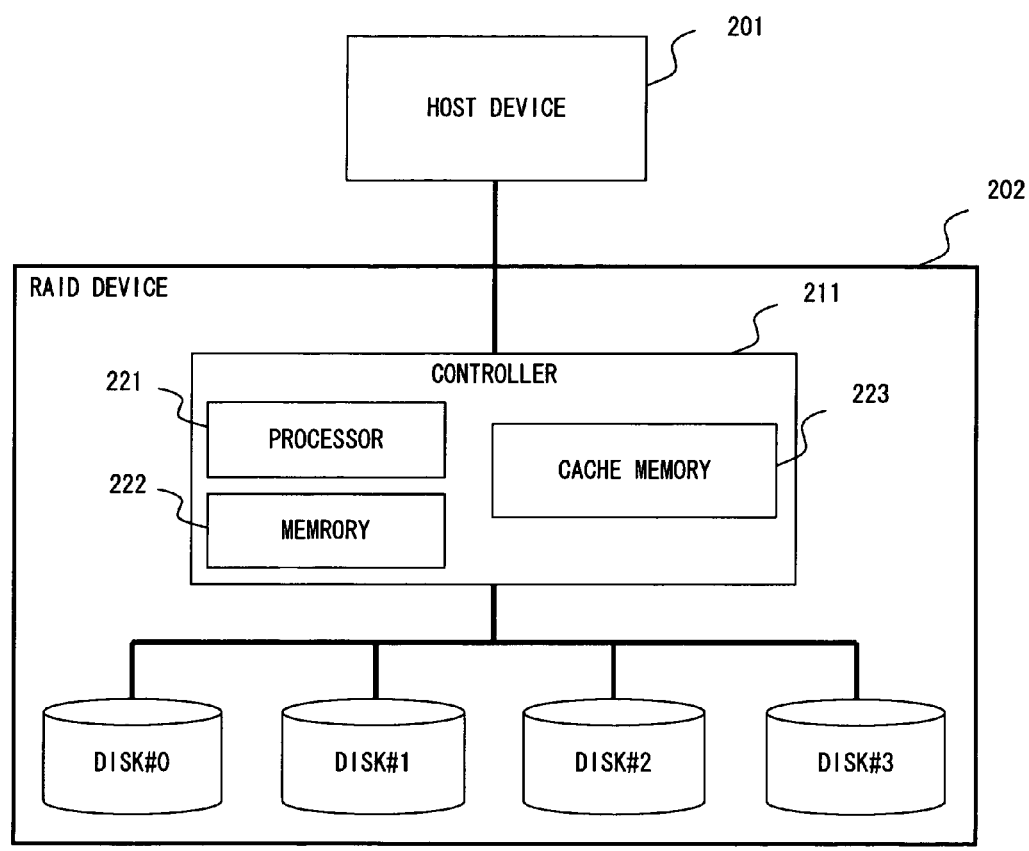
FIG. 2B shows a configuration of a first storage system.

FIG. 2B shows a configuration example of a storage system in an embodiment. The storage system in FIG. 2B comprises a host device 201 and a RAID device 202. The RAID device 202 corresponds to a storage apparatus comprising a controller 211 and four disks of Disk #0 to Disk #3.

Each disk comprises one or more magnetic disks, and the host device 201 reads/writes data, recognizing each disk as one storage device. However, it is noted that the number of the disks connected to the controller 211 is not limited to four, and more than four disks are connected to the controller 211 generally.

The controller 211 comprises a processor 221, memory 222 and cache memory 223, and executes a rebuild process in the case of the failures in the Disk #0 to Disk #3. The processor 221 executes a program stored in the memory 222, and thereby executes the rebuild process by using the cache memory 223 as a data buffer.

In the present embodiment, in order to improve the rebuild process for the failures in two disks, counter schemes 1 to 6 shown in FIG. 3 are employed. First, the outlines of respective counter schemes are explained by referring to FIG. 4 to FIG. 8.

1. Scheme of Separate Execution (Counter Scheme 1)

The controller 211 separately executes the rebuild processes for the first disk and the second disk. Especially, in the rebuild process for the duplicately failing areas corresponding to the failing areas in both disks, the data/parity in the two disks are restored on the data buffer while only the restored data/parity of one disk is written in a disk and the restored data/parity of the other disk is discarded without being written.

For example, a case where a disk #0 fails first, and a disk #1 fails while the data/parity in the disk #0 is being restored by using a hot spare HS #0 as shown in FIG. 4 is explained. In this case, until the disk #1 fails, the data/parity in the disk #0 is restored by the rebuild process for the failure in one disk by using the data/parity in the normally operating disks #1 to #3.

When the disk #1 fails, the data/parity in the rebuilt area in the hot spare HS #0 is held as it is without being discarded, and only the data/parity remaining non-restored is restored by the rebuild process for the failures in two disks. In this process, the data/parity remaining non-restored is restored in the hot spare HS #0 by using the data/parity in the normally operating disks #2 to #3. Upon this, the data/parity in the disk #1 is created at the same time, however, rebuild process for the disk #1 is executed separately and independently, therefore, the created data/parity is discarded.

As for the hot spare HS #1, the entire data/parity is restored by the rebuild process for the failures in two disks by using the data/parity in the normally operating disks #2 and #3 parallelly with the rebuild process for the hot spare HS #0. Upon this, the data/parity of the disk #0 created at the same time by the rebuild process for the failures in two disks is discarded.

According to the above rebuild process, when the disk #1 fails, the rebuild process for the disk #0 is switched from the rebuild process for the failure in one disk in which only the disk designated as the restoration target fails into the rebuild process for the failures in two disks in which there is another failing disk in addition to the disk designated as the restoration target, and the data/parity in the restored area is held as it is. Accordingly, the second restoration for the data/parity in the restored area as shown in FIG. 1C is not required so that the restoration of the disk #0 is completed in a shorter time than the restoration shown in FIG. 1C.

2. Scheme of Waiting for the Correspondence of the Progress Positions (Counter Scheme 2)

When the second disk fails, the controller 211 temporarily halts the rebuild process for the first disk, and rebuilds only the second disk until a progress position in the second disk corresponds to that in the first disk. From when the above correspondence is realized, both of the disks are rebuilt simultaneously.

Figure 5:
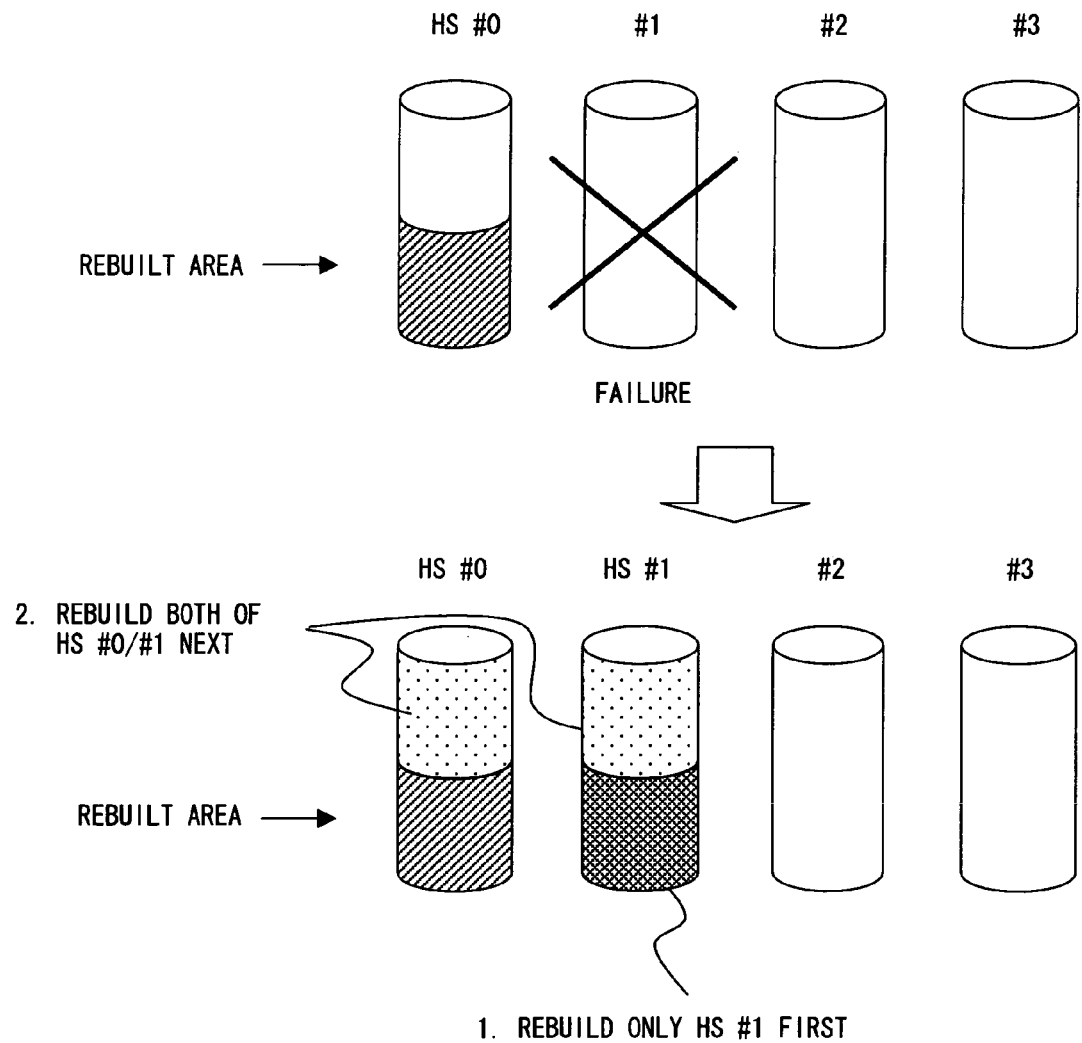
FIG. 5 shows a counter scheme 2.

For example, a case where the disk #0 fails first, and the disk #1 fails while the data/parity in the disk #0 is being restored by using the hot spare HS #0 as shown in FIG. 5 is explained. The operations until the disk #1 fails are the same as those in FIG. 4.

When the disk #1 fails, initially only the data/parity in the hot spare HS #1 corresponding to the rebuilt area in the hot spare HS #0 is restored by the rebuild process for the failure in one disk by using the data/parity in the rebuilt area in the hot spare #0 and the data/parity in the normally operating disks #2 and #3. When the restoration of the above data/parity in the hot spare HS #1 is completed, the remaining data/parity respectively in the host spare HS #0 and the hot spare HS #1 are simultaneously restored by the rebuild process for the failures in two disks by using the data/parity in the normally operating disks #2 and #3.

According to the above rebuild process, in addition to the same merit as that in the counter scheme 1, the merit is obtained that the data/parity in the restored area in the disk #0 which is currently restored is efficiently utilized for the restoration of the disk #1 so that the rebuild process for the disk #1 can be executed more efficiently.

3. Combining Scheme (Counter Scheme 3)

This is a scheme in which the counter schemes 1 and 2 are combined. The controller 211 selects the restoration method by monitoring the progress positions of the rebuild processes for two disks HS #0 and HS #1 during the rebuild process. Specifically, the controller 211 checks the difference between the progress positions respectively in the disk HS #0 and the disk HS #1, and when the difference is equal to or greater than the prescribed threshold value, the counter scheme 1 is applied so that the priority is given to the rebuild process for the disk HS #0. When the difference is smaller than the above threshold value, the counter scheme 2 is applied so that the rebuild process for the disk HS #1 is executed until both progress positions correspond to each other. The check of the progress positions is conducted each time the data/parity in the prescribed unit is restored or is conduced each time the data/parity in the prescribed area is restored.

When the counter scheme 2 is applied, the difference between the progress positions in the hot spares HS #0 and HS #1 corresponds to the waiting time for the start of the restoration for the duplicately failing areas in which the redundancy is lost and the greater the difference of the progress positions is, the more the restoration of the redundancy delays. Thus, when above the waiting time is longer than the prescribed period of time, the counter scheme 1 is applied in order to avoid the above too long delay so that the rebuild processes are in parallel executed for the hot spares HS #0 and HS #1.

However, in this scheme, a difference from the counter scheme 1 is that the data/parity in the hot spare HS #1 which is not in the duplicately failing areas in the hot spare HS #1 is restored by the rebuild process for the failure in one disk by using the data/parity in the rebuilt area in the hot spare HS #0 and the data/parity in the normally operating disks #2 and #3. Generally, in the rebuild process for the failures in two disks, more computation amount is required than that in the rebuild process for the failure in one disk. Accordingly, it is highly possible that the rebuild process for the failure in one disk executed for the hot spare HS #1 progresses faster than the foregoing rebuild process for the failures in two disks executed for the hot spare HS #0 so that the difference of the progress positions is made smaller as time elapses.

According to the above rebuild process, in addition to the same merit as that in the counter scheme 2, the merit is obtained that the delay of the restoration of the redundancy due to the wait for the start of restoration can be avoided. Also, the efficient utilization of the processor resources and the like can by realized by the parallel processing.

4. Scheme in which the Duplicately Failing Areas are Priorly Restored (Counter Scheme 4)

The controller 211 holds the current progress position of the first disk as the restoration completion position (the stop position which will be described later) when the second disk fails, and executes the rebuild processes simultaneously for both disks from the above positions. When the above rebuild processes simultaneously executed for both disks are completed, the rebuild process is executed from the beginning end to the restoration completion position in the second disk and restores the data in non-rebuilt area in the second disk.

For example, a case where the disk #0 fails first, and the disk #1 fails while the data/parity in the disk #0 is being restored by using the hot spare HS #0 as shown in FIG. 6 is explained. The operations until the disk #1 fails are the same as those in FIG. 4.

When the disk #1 fails, the data/parity in the hot spare HS #0 and the data/parity in the hot spare HS #1 which correspond to the non-rebuilt area in the hot spare HS #0 are simultaneously restored by the rebuild process for the failures in two disks by using the data/parity in the normally operating disks #2 and #3. When the above data/parity corresponding to the non-rebuilt is restored, the remaining data/parity in the hot spare HS #1 is restored by the restoration process for the failure in one disk by using the data/parity in the rebuilt area in the hot spare HS #0 and the data/parity in the normally operating disks #2 and #3.

When there is a usual access of read/write of RAID 6 during the rebuild process, it is checked whether or not the access target data is rebuilt, or all the usual accesses of read/write are degenerated such as rebuilding the data and at the same time returning the rebuilt data against the read request.

According to the above rebuild process, in addition to the same merit as that in the counter scheme 2, the merit is obtained that the redundancy as the RAID group can be restored in a shorter time by priorly restoring the data/parity in the duplicately failing areas.

5. Scheme in which the Restoration for Duplicately Failing Areas and the Restoration Using the Restored Hot Spare HS are Executed in Parallel (Counter Scheme 5)

The controller 211 executes the rebuild process from the beginning end to the restoration completion position in the second disk (the process later executed in the counter scheme 4) in parallel with the rebuild process for the duplicately failing areas without the wait.

For example, a case where the disk #0 fails first, and the disk #1 fails while the data/parity in the disk #0 is being restored by using the hot spare HS #0 as shown in FIG. 7 is explained. The operations until the disk #1 fails are the same as those in FIG. 4.

When the disk #1 fails, the process for restoring the data/parity in the duplicately failing areas of the hot spares #0 and #1 by the rebuild process for the failures in two disks by using the data/parity in the normally operating disks #2 and #3, and the process for restoring the data/parity in the remaining area in the hot spare HS #1 by the rebuild process for the failure in one disk by using the data/parity in the rebuilt area in the hot spare HS #0 and the data/parity in the normally operating disks #2 and #3 are parallelly executed.

When there is a usual access of read/write during the rebuild process, similarly to the counter scheme 4, it is checked whether or not the access target data is rebuilt, or the accesses are degenerated.

According to the above rebuild process, a longer time for the restoration of the redundancy as the RAID group is required than in the counter scheme 4, however, the time for the restoration of the entirety is reduced because the processes for restoring the duplicately failing areas in which the redundancy is lost and the other areas in which the redundancy remains are executed in parallel.

6. Scheme of Random Restoration (Counter Scheme 6)

The controller 211 executes a rebuild process for each prescribed area on the disks by using a bitmap on the cache memory 223. As the rebuild order, the order of one of the above counter schemes 1 to 5 is employed. From the viewpoint of the preservation of the data/parity it is basically desirable to employ the order of the counter scheme 4, however, the orders of other counter schemes can be employed for realizing this scheme.

Also, when the rebuild operation is executed as one of processes in the usual read/write access, the fact that the corresponding area is rebuilt is recorded in the bitmap. Accordingly, as the rebuild process, the sequential rebuild processes independent to the read/write access, and the point-to-point rebuild processes as one of the processes in the read/write access are employed at the same time. In the point-to-point rebuild process, when the data is restored in response to the read request, the controller 211 writes the restored data in the corresponding position in the disk.

The controller 211 prepares the bitmap in which one striping corresponds to one bit for example, and manages the progress. If the bitmap is lost, the rebuild process is started from the beginning. The bitmap, in which one logical block corresponds to one bit, can be employed too.

Also, when the memory area for the bitmap can not be obtained at first, the controller 211 executes one of the operations below.

Execute the rebuild process by employing the above counter schemes other than the present scheme.

Set the upper limit of the size for the bitmap and when the bitmap, whose size exceeds the set size, is required, executes the rebuild process after obtaining the resource.

The controller 211 can execute the rebuild operations in parallel, and has the functions of back-up/restoration of the bitmap, and turning the power supply on/off. When the controller 211 is made redundant (duplexity), the bitmap is also basically duplexed between the controllers, however, even when the bitmap is not duplexed, the data is not lost. As previously described, when the bitmap is lost, the rebuild process is restarted.

For example, a case where the disk #0 fails first, and the disk #1 fails while the data/parity in the disk #0 is being restored by using the hot spare HS #0 as shown in FIG. 8 is explained.

The controller 211 creates a bitmap for each of the hot spares HS #0 and HS #1, and manages each striping as the data of one bit. For the striping in the non-rebuilt area, "1" is recorded as the corresponding bit, and for the striping in the rebuilt area, "0" is recorded. For all the stripings in the rebuilt area in the hot spare HS #0, "0" is each recorded as the corresponding bit at the moment when the disk #1 fails, and for the other stripings, "0" is each recorded when the corresponding area is rebuilt.

According to the above rebuild process, in addition to the same merits as those in the counter schemes 1 to 5, the merits obtained are ones where the process is effectively executed by writing the data/parity restored by the point-to-point rebuild process back in the disk, and recognizing the above data/parity as the restored data/parity.

Next, the above counter schemes will be explained in detail, by referring to FIG. 9 to FIG. 19.

The rebuild process in each counter scheme is triggered by a failure in a disk, or by other rebuild processes. The controller 211 designates the triggering disk designated as a treated Main, and adds another failing disk as a treated Sub as occasion demands. In the rebuild process, restoration processes are executed regarding the current positions common between the treated Main and the treated Sub as shown in FIG. 9. The words of "current position" mean the place at which the restoration process is currently executed.

Also, the controller 211 holds the information regarding all the disks constituting the RAID device 202 as the control information common among all the counter schemes in the cache memory 223. Specifically, the information such as the restoration status (restored, being restored and non-restored), the restoration start position, and the stop position (if needed) is held regarding each disk as shown in FIG. 10. Regarding the normally operating disk, all the areas are set as restored.

The restoration start position of the failing disk corresponds to the current position of the restoration process executed for that failing disk designated as the treated Main, and when the restoration process is not executed, the restoration start position is set to the end of the disk (lower end of the disk in FIG. 9). The restoration process progresses from the restoration start position to the upper direction. The stop position means the position at which the restoration process has to stop.

The restoration status is managed for each area in a unit such as a strip, a logical block and the like. The position information such as the current position, the restoration start position, the stop position and the like is managed by using the address of the area in the unit or the identifier of the stripe to which the area in the unit belongs.

FIG. 11 is a flowchart of a rebuild process. The controller 211, initially, sets the end of the treated Main (lower end of the disk in FIG. 9) as the current position (step 1101), and executes a restoration process by executing the restoration routine (step 1102). In this restoration routine, the data/parity designated as the restoration target in the disk designated as the restoration target is created by using the data/parity in other disks, and the restored data/parity is written in the corresponding hot spare. As the restoration process is executed once, the data/parity in the prescribed unit such as the logical block, the striping and the like is restored. Generally, the restoration is executed in a unit of striping as the prescribed unit.

Next, a process after restoration for the rebuild control is executed (step 1103). In the process after restoration, the setting of restoration start position, the determination of whether or not the restoration process is to be ended, and the like are conducted. Thereafter, it is checked whether or not the restoration process is determined to be ended in the above process after restoration (step 1104). When the restoration process is not determined to be ended, the process of the step 1102 and the subsequent steps are repeated after progressing the current position just by one stripe (step 1105), and when the restoration process is determined to be ended, the rebuild process is ended.

In the restoration routine of the step 1102 and the process after restoration of the step 1103, different operations are executed among counter schemes, accordingly, explanation thereof will be given in the order from the counter scheme 1 to the counter scheme 6.

1. Counter Scheme 1

In the counter scheme 1, the rebuild process in FIG. 11 is triggered by a failure in each disk, and the triggering disk is designated as the treated Main. However, another failing disk is not added as the treated Sub. Therefore, after the failure in the second disk, two rebuild processes are executed in parallel, and only the treated Main is the disk designated as the restoration target in each rebuild process.

FIG. 12 is a flowchart of a restoration routine of the counter scheme 1. The controller 211, initially, sets the treated Main as the restoration target disk, sets the current position in the disk (step 1201), and checks the number of the failing disks (step 1202). When the number of the failing disks is one, it is determined to employ the rebuild process for the failure in one disk as the restoration method (step 1203).

Next, among the data/parity belonging to the stripe at the current position, the data/parity which is needed for the rebuild process for the failure in one disk is read from the normally operating disks (step 1205) and it is checked whether or not all of the above needed data/parity is read (step 1206). When all the above data/parity is read, the data/parity in the restoration target disk belonging to the same stripe is restored by using the read data/parity, and the restored data/parity is written in the corresponding hot spare (step 1207).

In the case where a read error occurs in the step 1206, it is recognized that the disk designated as the read target fails. Then, the number of the failing disks is checked (step 1208), and when the above number is two, the processes of the step 1202 and the subsequent steps are executed.

Then, the restoration method is switched into the rebuild process for the failures in two disks (step 1204), and the data/parity which is needed for the rebuild process for the failures in two disks is read from the normally operating disks (step 1205). When all the above data/parity is read, the data/parity in the restoration target disk is restored by using the read data/parity, and the restored data/parity is written in the corresponding hot spare (step 1207).

When another read error occurs in addition to the two failing disks, the number of the disks which are recognized as the failing disks becomes three (step 1208) so that it is determined that the restoration is impossible, accordingly, the error process is executed (step 1209).

Figure 13:
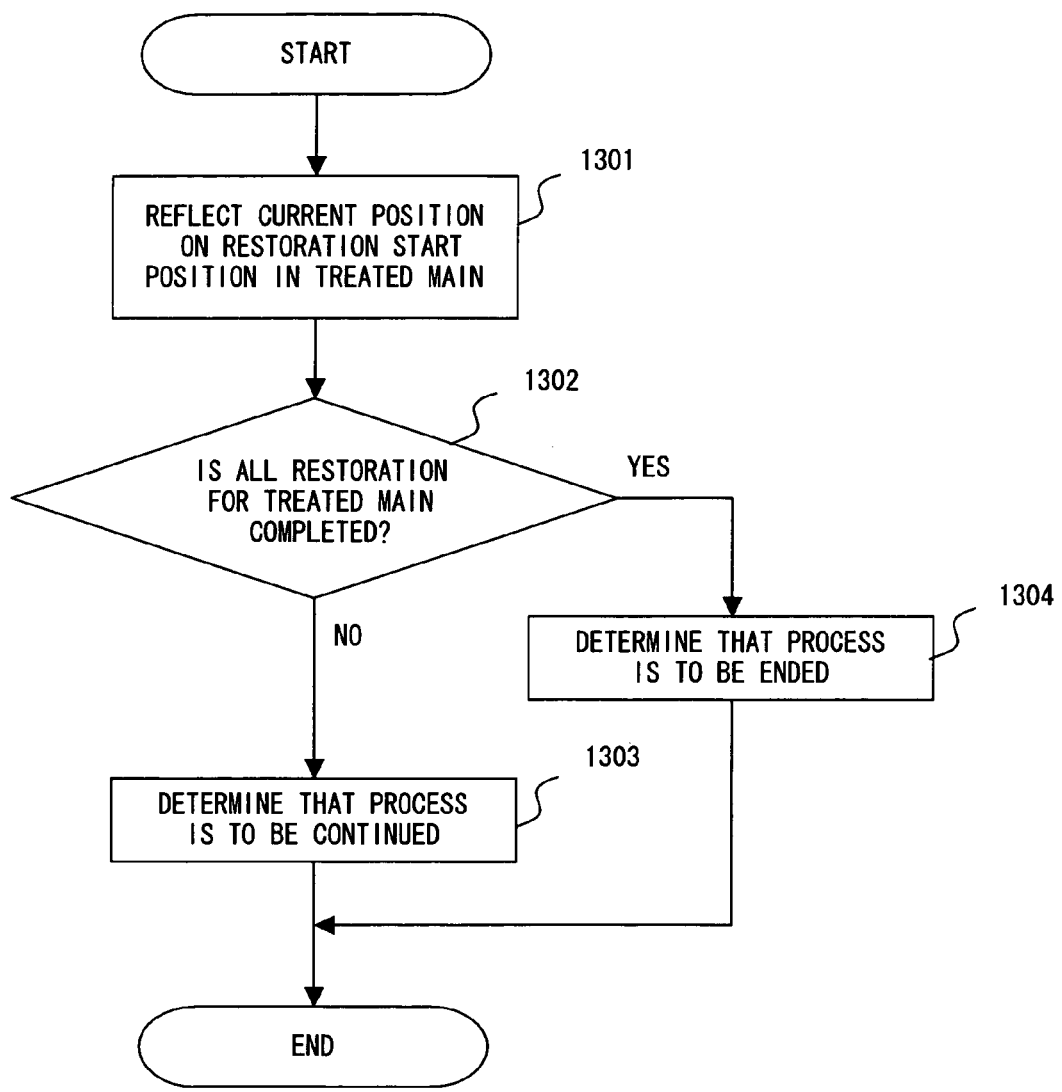
FIG. 13 is a flowchart of a process after restoration in the counter scheme 1.

FIG. 13 is a flowchart of the process after restoration in the counter scheme 1. The controller 211, initially, sets the current position used in the restoration routine to the restoration start position in the treated Main (step 1301), and checks whether or not the restoration for the entire area in the treated Main is completed (step 1302). In this example, when the current position used in the restoration routine has reached the end of the treated Main (upper end of the disk in FIG. 9), it is determined that the restoration for the entire area is completed. When the restoration for the entire area is not completed, it is determined that the restoration process has to be continued (step 1303), and when the restoration for the entire area is completed, it is determined that the restoration process is to be ended (step 1304).

For example, when the disk #0 fails first, the rebuild process is triggered for the disk #0 designated as the treated Main as shown in FIG. 4. At that moment, the number of the failing disks is one (step 1202 in FIG. 12), so that the rebuild process for the failure in one disk is employed (step 1203). Accordingly, among the data/parity in the normally operating disks #1 to #3, the data/parity which is needed for restoring the data/parity in the disk #0 by the rebuild process for the failure in one disk is read (step 1205). Then, the data/parity in the disk #0 is restored by using the read data/parity and the restored data/parity is written in the hot spare HS #0 (step 1207).

The current position in the disk #0 is set as the restoration start position in the disk #0 (step 1301 in FIG. 13), and it is determined that the restoration process is to be continued (step 1303). The restoration start position is referred to by other processes such as the read/write access and the like to the disk #0. The restoration routine and the process after restoration as above are repeatedly executed for each one striping (step 1105 in FIG. 11).

Next, when the disk #1 fails, the number of the failing disks becomes two (step 1202) so that the restoration method is switched into the rebuild process for the failures in two disks (step 1204), and the data/parity which is needed for restoring the data/parity in the disks #0 and #1 by the rebuild process for the failures in two disks is read from the normally operating disks #2 and #3 (step 1205). Then, the data/parity in the disks #0 and #1 is restored by using the read data/parity, and the data/parity in the disk #0 among the restored data/parity is written in the hot spare #0 (step 1207).

The process after restoration which is the same as that before the failure in the disk #1 is executed. The restoration routine and the process after restoration as above are repeatedly executed for each one striping (step 1105), and when the restoration for the entire area in the disk #0 is completed (step 1304), it is determined that the rebuild process for the disk #0 is to be ended (step 1104).

Further, in the case where the disk #1 fails, another rebuild process is triggered for the disk #1 designated as the treated Sub. Upon this, the number of the failing disks is two (step 1202) so that the rebuild process for the failures in two disks is employed (step 1204), and the data/parity which is needed for restoring the data/parity in the disks #0 and #1 by the rebuild process for the failures in two disks is read from the normally operating disks #2 and #3 (step 1205).

Then, the data/parity in the disks #0 and #1 is restored by using the read data/parity, and the data/parity in the disk #1 among the restored data/parity is written in the hot spare #1 (step 1207).

The process after restoration which is the same as that before the failure in the disk #0 is executed. The restoration routine and the process after restoration as above are repeatedly executed for each one striping (step 1105), and when the restoration for the entire area in disk #0 is completed (step 1304), it is determined that the rebuild process for the disk #1 is to be ended (step 1104).

2. Counter Scheme 2

In the counter scheme 2, similarly to the counter scheme 1, the rebuild process in FIG. 11 is triggered by a failure in each disk, and the triggering disk is designated as the treated Main. When the second disk fails, the rebuild process for the first failing disk designated as the treated Main is suspended, and the rebuild process for the second failing disk designated as the treated Main starts. When the current position in the second failing disk reaches the progress position which is the same as that in the first failing disk, the first failing disk is added as the treated Sub.

FIG. 14 is a flowchart of a restoration routine of the counter scheme 2. In this case, not similarly to the restoration routine in FIG. 12, the restoration target disk is expressed by the treated Main and the treated Sub, and at most two disks can be set as the restoration target disks. Also, the restoration method is selected in accordance with the number of the restoration target disks, instead of failing disks.

The controller 211, initially, sets the treated Main/the treated Sub designated as the restoration target disks, sets the current position in the treated Main (step 1401). When the treated Sub is not set, only the treated Main is set as the restoration target disk.

Next, the controller 211 checks the number of the restoration target disks (step 1402). When the number of the restoration target disk is one, it is determined to employ the rebuild process for the failure in one disk designated as the restoration method (step 1403). And the data/parity which is needed for the rebuild process for the failure in one disk among the data/parity belonging to the stripe of the current position is read from the normally operating disks (step 1405), and it is checked whether or not all the above needed data/parity is read (step 1406). When all the above data/parity is read, the data/parity in the restoration target disks belonging to the same stripe is restored by using the read data/parity, and the restored data/parity is written in the corresponding hot spare (step 1407).

In the case where a read error occurs in the step 1406, it is recognized that the disk designated as the read target fails. Then, the number of the failing disks is checked (step 1408), and when the above number is one, the failing disk is added as the restoration target disk (step 1410) and the processes of the step 1402 and the subsequent steps are executed.

Then, the restoration method is switched into the rebuild process for the failures in two disks (step 1404), and the data/parity which is needed for the rebuild process for the failures in two disks is read from the normally operating disks (step 1405). When all the above data/parity is read, the data/parity in the restoration target disks is restored by using the read data/parity, and the restored data/parity is respectively written in the corresponding hot spares (step 1407).

When another read error occurs in addition to the two failing disks, the number of the disks which are recognized as the failing disks be comes three (step 1408) so that it is determined that the restoration is impossible, accordingly, the error process is executed (step 1409).

Figure 15:
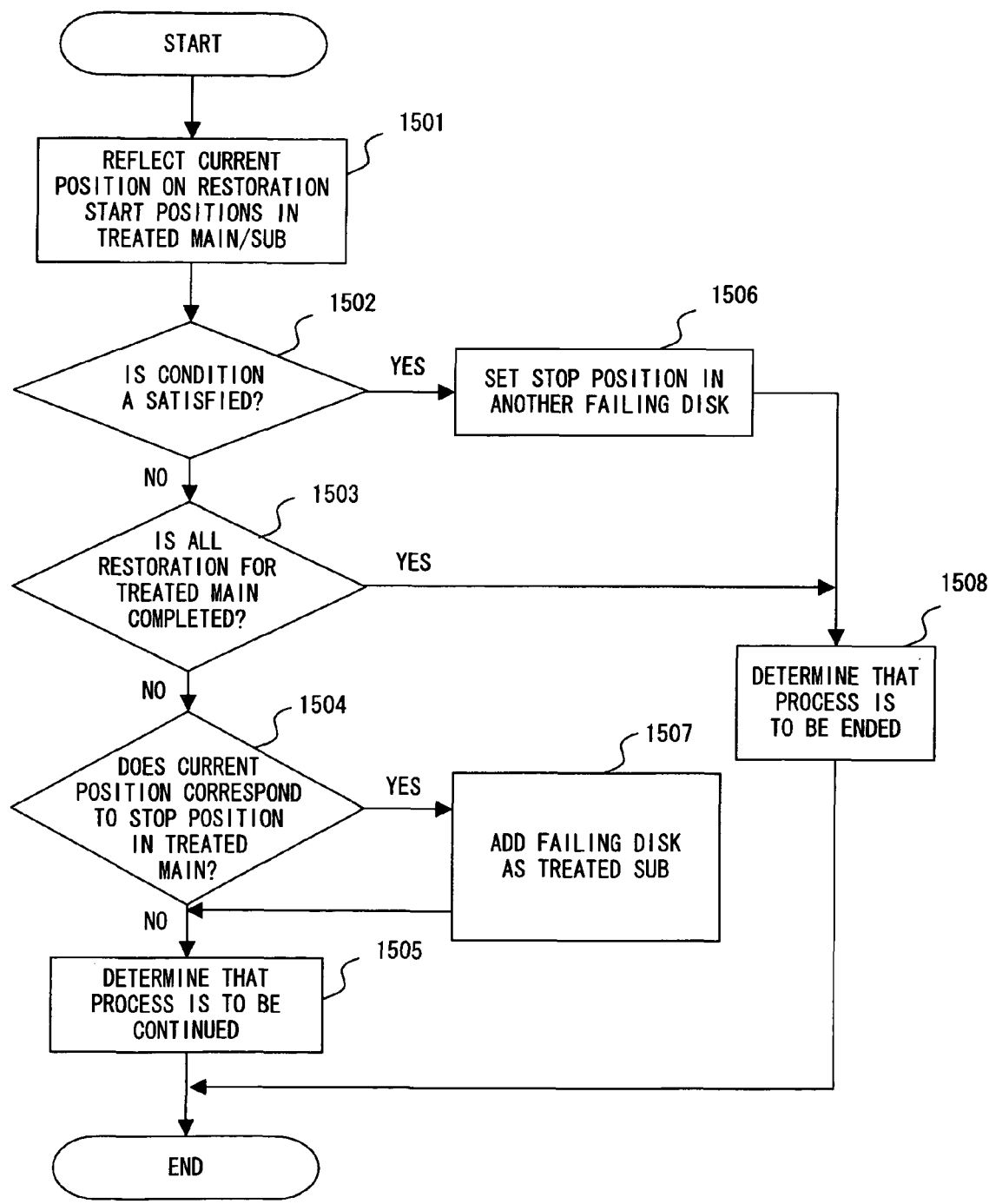
FIG. 15 is a flowchart of the process after restoration in the counter scheme 2.

FIG. 15 is a flowchart of the process after restoration in the counter scheme 2. The controller 211, initially, sets the current position in the treated Main at the time when the restoration routine is ended as the restoration start positions in the treated Main/the treated Sub (step 1501), and checks whether or not the following condition a is satisfied (step 1502).

Condition a: There is another failing disk in addition to the treated Main, the stop position is set neither in the treated Main nor in another failing disk, and the restoration start position in another failing disk is behind (lower than) that in the treated Main.

The fact that the restoration start position in the above other failing disk is behind that in the treated Main means that the restoration process in the other failing disk is executed with a delay to that in the treated Main. When the condition a is satisfied, the restoration start position in the treated Main is set as the stop position in another failing disk (step 1506), and it is determined that the restoration process is to be ended in order to suspend the rebuild process for the treated Main (step 1508).

When the condition a is not satisfied, next, it is checked whether or not the restoration for the entire area in the treated Main is completed (step 1503). When the restoration for the entire area is completed, it is determined that the restoration process is to be ended (step 1508).

When the restoration for the entire area is not completed, it is checked whether or not the stop position is set in the treated Main, and at the same time, the current position in the treated Main corresponds to the above stop position (step 1504). When the current position corresponds to the stop position, another failing disk is added as the treated Sub (step 1507) and it is determined that the restoration process is to be continued (step 1505).

When the current position does not correspond to the stop position, and when the stop position is not set, it is determined that the restoration process is to be continued as it is (step 1505).

For example, as shown in FIG. 5, when the disk #0 fails first, the rebuild process for the disk #0 as the treated Main is triggered. Upon this, the rebuild process for the failure in one disk is employed (step 1403 in FIG. 14) because the number of the restoration target disks is one (step 1401 in FIG. 14), and the data/parity which is needed for restoring the data/parity in the disk #0 by the rebuild process for the failure in one disk is read from the normally operating disks #1 to #3 (step 1405). And the data/parity in the disk #0 is restored by using the read data/parity, and the restored data/parity is written in the hot spare HS #0 (step 1407).

The current position in the disk #0 is set as the restoration start position in the disk #0 (step 1501 in FIG. 15), and it is determined that the restoration process is to be continued (step 1505) because there is not another failing disk (step 1502). The restoration routine and the process after restoration as above are repeatedly executed for each one striping (step 1105 in FIG. 11).

Next, when the disk #1 fails, the condition a is satisfied (step 1502) because the restoration start position in the disk #0 designated as the treated Main corresponds to the current position in the disk #0 (step 1501), and the restoration start position in the disk #1 as another failing disk corresponds to the lower end of the disk #1. Then, the restoration start position in the disk #0 is set to the stop position in the disk #1 (step 1506), and it is determined that the restoration process is to be ended (step 1508). Thereby, the rebuild process for the disk #0 designated as the treated Main is suspended (step 1104).

Upon this, another rebuild process for the disk #1 designated as the treated Main is triggered. The rebuild process for the failure in one disk is employed (step 1403) because the number of the restoration target disks is one (step 1401), and the data/parity which is needed for restoring the data/parity in the disk #1 by the rebuild process for the failure in one disk is read from the normally operating disks #0, #2 and #3 (step 1405). However, as for the disk #0, only restored data/parity which has been written in the hot spare HS #0 is read.

Then, the data/parity in the disk #1 is restored by using the read data/parity and the restored data/parity is written in the hot spare HS #1 (step 1407).

The current position in the disk #1 is set as the restoration start point in the disk #1 (step 1501), and the condition a is not satisfied (step 1502) because the stop position is already set in the disk #1. Further, because the current position in the disk #1 has not reached the stop position in the disk #1 (step 1504), it is determined that the restoration process is to be continued (step 1505). The restoration routine and the process after restoration as above are repeatedly executed for each one striping (step 1105).

When the current position in the disk #1 reaches the stop position in the disk #1 (step 1504), the disk #0 for which the restoration process is suspended is added as the treated Sub (step 1507), and it is determined that the restoration process is to be continued (step 1505). Thereby, the current position is updated (step 1105).

Thereby, the number of the restoration target disks becomes two (step 1404), the restoration method is switched into the rebuild process for the failures in two disks (step 1404), and the data/parity which is needed for restoring the data/parity in the disks #0 and #1 by the rebuild process for the failures in two disks is read from the normally operating disks #2 and #3 (step 1405). And the data/parity in the disks #0 and #1 is restored by using the read data/parity, and the restored data/parity is respectively written in the hot spares HS #0 and HS #1 (step 1407).

The current position in the disk #1 is set as the restoration start positions in the disks #0 and #1 (step 1501), and because the current position in the disk #1 has exceeded the stop position in the disk #1 (step 1504), it is determined that the restoration process is to be continued (step 1505).

The restoration routine and the process after restoration as above are repeatedly executed for each one striping (step 1105). When the restoration for the entire area in the disk #1 is completed (step 1508), the rebuild process for the disk #1 designated as the treated Main is ended (step 1104). Also, because the current position in the disk #0 as the treated Sub has reached the upper end of the disk #0 at the above moment, also the restoration for the disk #0 is ended together.

3. Counter Scheme 3

In the counter scheme 3, similarly to the counter scheme 2, the rebuild process in FIG. 11 is triggered by a failure in each disk, and the triggering disk is designated as the treated Main. When the second disk fails, the counter scheme 1 or the counter scheme 2 is selected in accordance with the difference between the progress positions respectively in the two failing disks.

When the difference between the progress positions is equal to or greater than the threshold value, the counter scheme 1 is selected so that two rebuild processes are parallelly executed. However, in this scheme, a difference from the counter scheme 1 is that the data/parity in the second failing disk is restored by the rebuild process for the failure in one disk by using the data/parity in the rebuilt area in the first failing disk and the data/parity in the normally operating disks.

When the difference between the progress positions becomes smaller than the above threshold value, the counter scheme 2 is selected so that the rebuild process for the first failing disk designated as the treated Main is suspended, and the rebuild process for the second failing disk designated as the treated Main starts. And when the current position in the second failing disk reaches the same progress position that is the same with that in the first failing disk, the first failing disk is added as the treated Sub.

Figure 16:
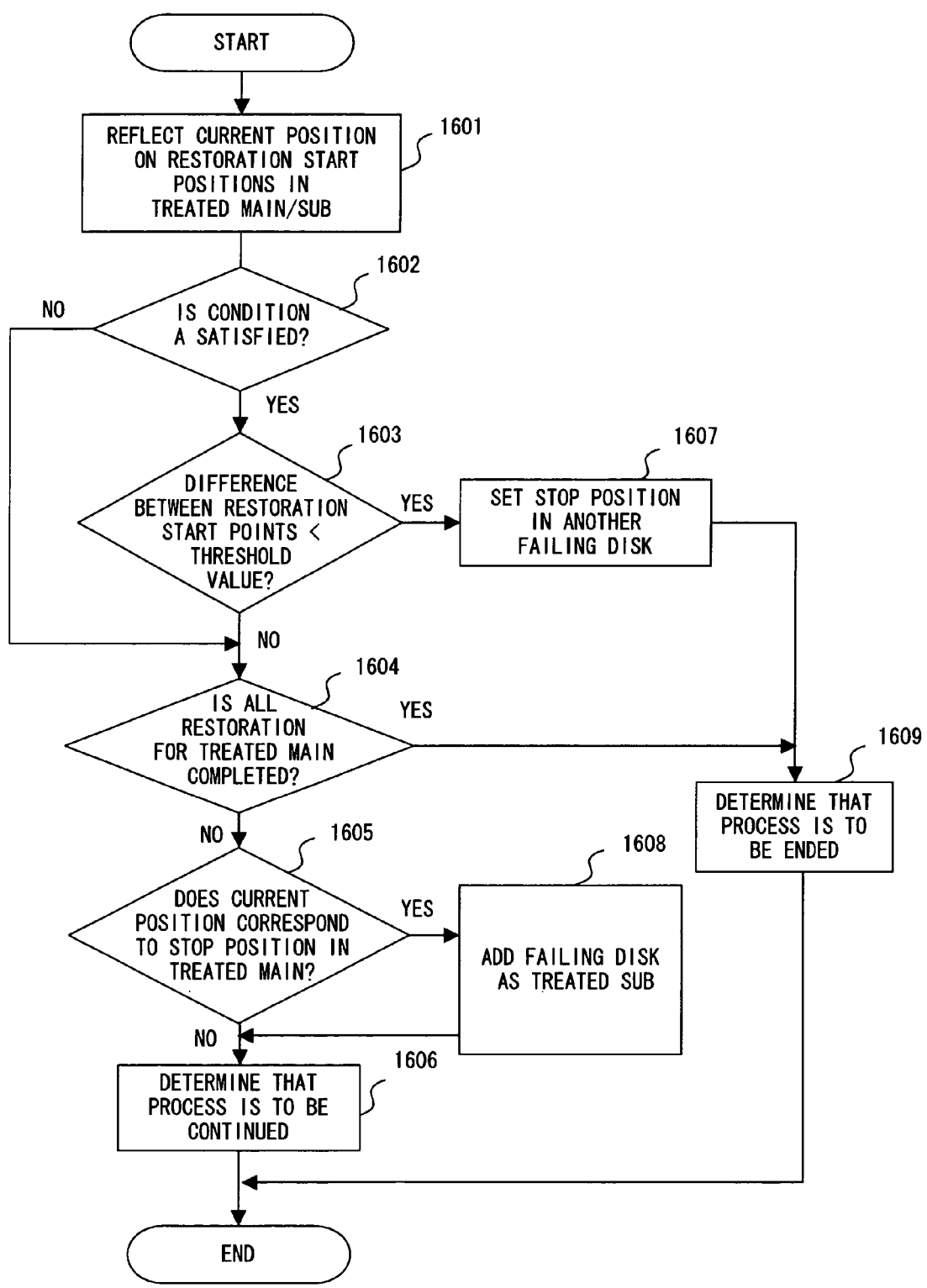
FIG. 16 is a flowchart of the process after restoration in the counter scheme 3.

The flowchart of the restoration routine in the counter scheme 3 is similar to that in the counter scheme 2, and the flowchart of the process after restoration is shown in FIG. 16. The process after restoration in FIG. 16 employs the configuration including the determination step of step 1603 in addition to the process after restoration in FIG. 15.

In the step 1603, the controller 211 compares, with the threshold value, the difference between the restoration start positions respectively in another failing disk and the treated Main. When the difference between the restoration start positions is smaller than the threshold value, the restoration start position in the treated Main is set to the stop position in another failing disk (step 1607), and it is determined that the restoration process is to be ended (step 1609). Also, when the above difference between the restoration start positions is equal to or greater than the threshold value, the processes of the step 1604 and the subsequent steps are executed.

Therefore, when the condition a described in the counter scheme 2 is satisfied and the difference between the restoration start positions respectively in another failing disk and the treated Main is smaller than the threshold value, the stop position is set in another failing disk (step 1607). In the cases other than the above, the stop position is not set.

When the disk #0 fails first as shown in FIG. 5 for example, the rebuild process for the disk #0 designated as the treated Main is triggered, and the process similar to that in the counter scheme 2 is executed until the disk #1 fails.

Next, when the disk #1 fails, the condition a is satisfied (step 1602 in FIG. 16) so that the difference between the restoration positions respectively in the disk #0 and the disk #1 is compared with the threshold value (step 1603). Upon this, if a sufficient period of time has elapsed since the failure of the disk #0, it is thought that the restoration process for the disk #0 has much progressed so that the difference between the restoration start positions has exceeded the threshold value. In this case, the processes of step 1604 and the subsequent steps are executed, and because the stop position is not set in the disk #0 (step 1605), it is determined that the restoration process is to be continued (step 1606).

Upon this, because the number of the restoration target disks is one (step 1401 in FIG. 14), the rebuild process for the failure in one disk is employed (step 1403), and the data/parity which is needed for restoring the data/parity in the disk #0 by the rebuild process for the failure in one disk is read from the normally operating disks #1 to #3 (step 1405).

Upon this, when the data/parity in the disk #1 is read, the read error occurs and the disk #1 is added as the restoration target disk (step 1410) so that the number of the restoration target disks becomes two.

Therefore, the restoration method is switched into the rebuild process for the failures in two disks (step 1404), and the data/parity which is needed for restoring the data/parity in the disks #0 and #1 by the rebuild process for the failures in two disks is read from the normally operating disks #2 and #3 (step 1405). And the data/parity in the disks #0 and #1 is restored by using the read data/parity, and the restored data/parity in the disk #0 among the above restored data/parity is written in the hot spare HS #0 (step 1407).

The current position in the disk #0 is set as the restoration start position in the disk #0 (step 1601), and the condition a is satisfied (step 1602), however, the difference between the restoration start positions is still greater than the threshold value (step 1603). Also, because the stop position is not set in the disk #0 (step 1605), it is determined that the restoration process is to be continued (step 1606). The restoration routine and the process after restoration as above are repeatedly executed for each one striping (step 1105 in FIG. 11).

Further, when the disk #1 fails, another rebuild process is triggered for the disk #1 designated as the treated Main. Because the number of the restoration target disks is one (step 1401), the rebuild process for the failure in one disk is employed (step 1403), and the data/parity which is needed for restoring the data/parity in the disk #1 by the rebuild process for the failure in one disk is read from the normally operating disks #0, #2 and #3 (step 1405). However, regarding the disk #0, the restored data/parity which has been written in the hot spare HS #0 is read.

Then, the data/parity in the disk #1 is restored by using the read data/parity, and the restored data/parity is written in the hot spare HS #1 (step 1407).

The current position in the disk #1 is set as the restoration start position in the disk #1 (step 1601), and because the restoration start position in the disk #0 designated as another failing disk has exceeded the restoration start position in the disk #1 designated as the treated Main, the condition a is not satisfied (step 1602). Also, because the stop position is not set in the disk #1 (step 1605), it is determined that the restoration process is to be continued (step 1606). The restoration routine and the process after restoration as above are repeatedly executed for each one striping (step 1105).

Thereby, the rebuild process for the failures in two disks for the disk #0 designated as the treated Main and the rebuild process for the failure in one disk for the disk #1 designated as the treated Main are executed in parallel so that the restoration start position in the disk #1 gradually approaches the restoration start position in the disk #0.

And when the difference between the restoration start positions respectively in the disk #0 and the disk #1 becomes smaller than the threshold value in the rebuild process for the disk #0 designated as the treated Main (step 1603), the restoration start position in the disk #0 is set to the stop position in the disk #1 (step 1607), and it is determined that the restoration process is to be ended (step 1609). Thereby, the rebuild process for the disk #0 designated as the treated Main is suspended (step 1104).

Thereafter, only the rebuild process for the disk #1 designated as the treated Main is continued, however, the condition a is not satisfied because the stop position is already set in the disk #1 (step 1602). Also, because the current position in the disk #1 has not reached the stop position in the disk #1 (step 1605), it is determined that the restoration process is to be continued (step 1606).

And when the current position in the disk #1 reaches the stop position in the disk #1 (step 1605), the disk #0 for which the restoration process is suspended is added as the treated Sub (step 1608), and it is determined that the restoration process is to be continued (step 1606). Thereby, the current position is updated (step 1105).

Thereby, the number of the restoration target disks becomes two (step 1401) so that the rebuild process for the failures in two disks is employed (step 1404), and the data/parity which is needed for restoring the data/parity in the disk #0 and the disk #1 by the rebuild process for the failures in two disks is read from the normally operating disks #2 and #3 (step 1405). And the data/parity in the disks #0 and #1 is restored by using the read data/parity, and the restored data/parity is respectively written in the hot spares HS #0 and HS #1 (step 1407).

The current position in the disk #1 is set as the restoration start positions in the disks #0 and #1 (step 1601) and the current position in the disk #1 has exceeded the stop position in the disk #1 (step 1605), accordingly, it is determined that the restoration process is to be continued (step 1606).

The restoration routine and the process after restoration as above are repeatedly executed for each one striping (step 1105). And when the restoration for the entire area in the disk #1 is completed (step 1609), the rebuild process for the disk #1 designated as the treated Main is ended (step 1104). Also, because the current position in the disk #0 designated as the treated Sub has reached the upper end of the disk #0 at the above moment, also the restoration for the disk #0 is ended together.

4. Counter Scheme 4

In the counter scheme 4, the rebuild process in FIG. 11 is triggered by a failure in a disk, or by other rebuild processes. And the triggering disk is designated as the treated Main. By the former trigger, only one rebuild process is triggered for each one RAID group. Accordingly, even when the second disk fails, another rebuild process is not triggered if the rebuild process for a RAID group has already been triggered.

When the second disk fails, the current position in the first failing disk is set as the stop position in the second failing disk, the second failing disk is added as the treated Sub, and the rebuild process is continued. And when the restoration for the first failing disk is completed, the rebuild process for the second failing disk designated as the treated Main is executed from the lower end to the stop position in the second failing disk. The flowchart of the restoration routine in the counter scheme 4 is similar to that in the counter scheme 2.

Figure 17:
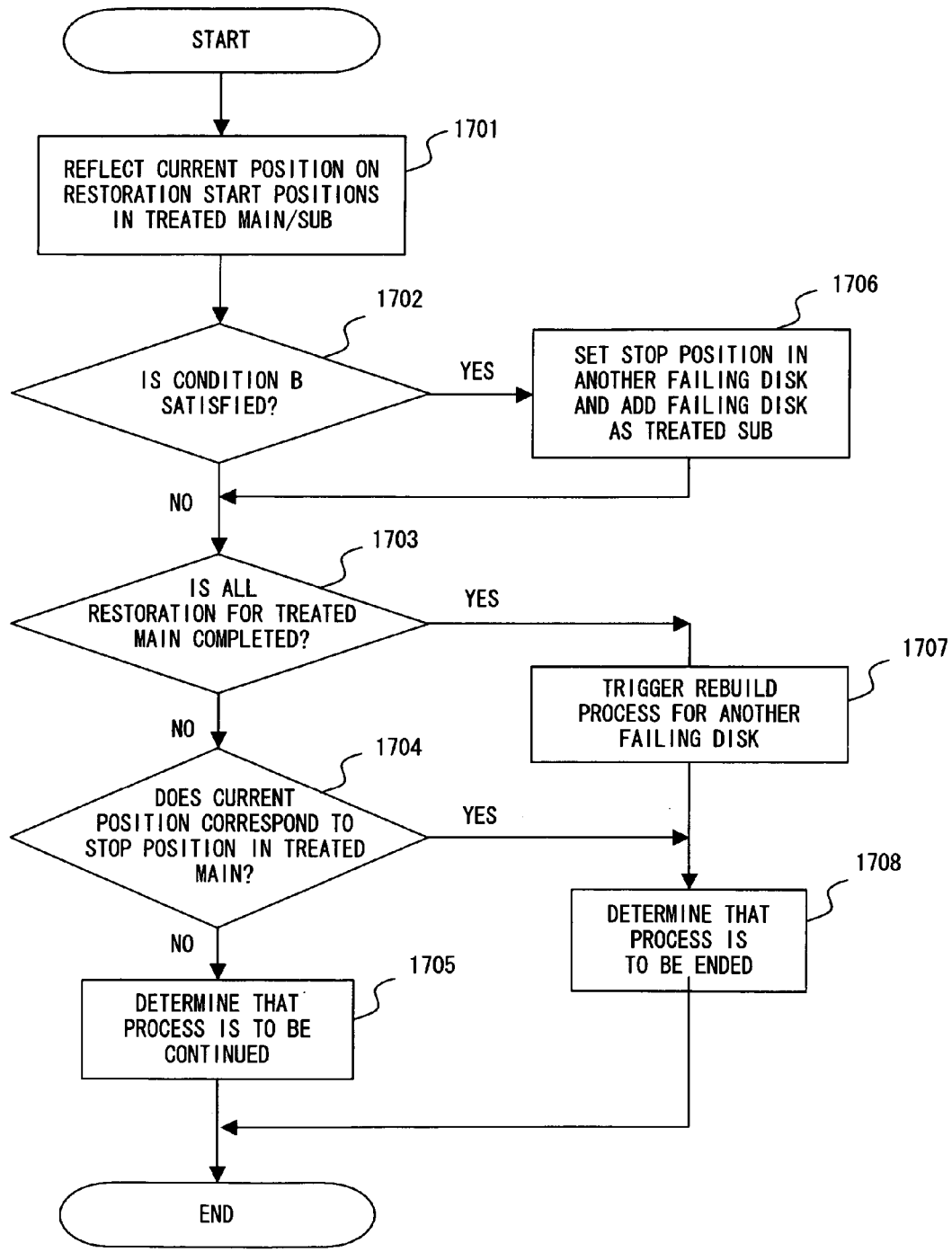
FIG. 17 is a flowchart of the process after restoration in the counter scheme 4.

FIG. 17 is a flowchart of the process after restoration in the counter scheme 4. The controller 211, initially, sets the current position in the treated Main at the moment when the restoration routine is ended to the restoration start positions in the treated Main/the treated Sub (step 1701), and checks whether or not the following condition b is satisfied (step 1702).

Condition b: There is another failing disk in addition to the treated Main, and the stop position is set neither in the treated Main nor in another failing disk.

When the condition b is satisfied, the restoration start position in the treated Main is set to the stop position in another failing disk, and another failing disk is added as the treated Sub (step 1706). Then, it is checked whether or not the restoration for the entire area in the treated Main is completed (step 1703). When the condition b is not satisfied, the process in the step 1703 is executed as it is.

When the restoration for the entire area in the treated Main is completed, it is checked whether or not there is another failing disk. When there is another failing disk, another rebuild process for another failing disk designated as the treated Main is triggered (step 1707). And, it is determined that the restoration process is to be ended (step 1708). When there is not another failing disk, it is determined that the rebuild process is to be ended without triggering another rebuild process (step 1708).

When the restoration for the entire area is not completed, it is checked whether or not the stop position in the treated Main corresponds to the stop position in the treated Main (step 1704). When the current position corresponds to the stop position, it is determined that the restoration process is to be ended (step 1708).

When the above current position does not correspond to the stop position, and when the stop position is not set, it is determined that the restoration process is to be continued as it is (step 1705).

For example, as shown in FIG. 6, when the disk #0 fails first, the rebuild process for the disk #0 designated as the treated Main is triggered. Upon this, the rebuild process for the rebuild process for the failure in one disk is employed (step 1403) because the number of the restoration target disks is one (step 1401 in FIG. 14), and the data/parity which is needed for restoring the data/parity in the disk #0 by the rebuild process for the failure in one disk is read from the normally operating disks #1 to #3 (step 1405). And the data/parity in the disk #0 is restored by using the read data/parity, and the restored data/parity is written in the hot spare HS #0 (step 1407).

The current position in the disk #0 is set as the restoration start position in the disk #0 (step 1701 in FIG. 17), and it is determined that the restoration process is to be continued (step 1705) because there is not another failing disk (step 1702). The restoration routine and the process after restoration as above are repeatedly executed for each one striping (step 1105 in FIG. 11).

Next, when the disk #1 fails, the condition b is satisfied (step 1702), the restoration start position in the disk #0 is set to the stop position in the disk #1, and the disk #1 is added as the treated Sub (step 1706). However, because the stop position is not set in the disk #0 (step 1704), it is determined that the rebuild process is to be continued (step 1705).

Upon this, the number of the restoration target disks becomes two (step 1401), so that the restoration method is switched into the rebuild process for the failures in two disks (step 1404), and the data/parity which is needed for restoring the data/parity in the disks #0 and #1 by the rebuild process for the failures in two disks is read from the normally operating disks #2 and #3 (step 1405). And the data/parity in the disks #0 and #1 is restored by using the read data/parity, and the restored data/parity is respectively written in the hot spares HS #0 and HS #1 (step 1407).

The current position in the disk #0 is set as the restoration start points in the disk #0 and the disk #1 (step 1701), and the condition b is not satisfied (step 1702) because the stop position is already set in the disk #1. Further, because the stop position is not set in the disk #0 (step 1704), it is determined that the rebuild process is to be continued (step 1705).

The restoration routine and the process after restoration as above are repeatedly executed for each one striping (step 1105). And when the restoration for the entire area in the disk #0 is completed (step 1703), another rebuild process for the disk #1 designated as the treated Main is triggered (step 1707), and it is determined that the restoration process is to be ended (step 1708). Thereby, the rebuild process for the disk #0 designated as the treated Main is ended (step 1104). At the above moment, the current position in the disk #1 designated as the treated Sub has reached the upper end of the disk #1.

Next, in the rebuild process for the disk #1 designated as the treated Main, the lower end in the disk #1 is set as the current position (step 1101). Upon this, the rebuild process for the rebuild process for the failure in one disk is employed (step 1403) because the number of the restoration target disks is one (step 1401), and the data/parity which is needed for restoring the data/parity in the disk #1 by the rebuild process for the failure in one disk is read from the normally operating disks #0, #2 and #3 (step 1405). However, regarding the disk #0, the restored data/parity which has been written in the hot spare HS #0 is read.

Then, the data/parity in the disk #1 is restored by using the read data/parity, and the restored data/parity is written in the hot spare HS #1 (step 1407).

The current position in the disk #1 is set as the restoration start position in the disk #1 (step 1701), and the stop position is already set in the disk #1, accordingly, the condition b is not satisfied (step 1702) Also, because the current position in the disk #1 has not reached the stop position in the disk #1 (step 1704), it is determined that the restoration process is to be continued (step 1705).

The restoration routine and the process after restoration as above are repeatedly executed for each one striping (step 1105), and the current position in the disk #1 reaches the stop position. At this moment, the current position in the disk #1 has not reached the upper end of the disk #1 so that it is determined that the restoration for the entire area is not completed (step 1703). However, the current position corresponds to the stop position (step 1704), it is determined that the restoration process is to be ended (step 1708). Thereby, the rebuild process for the disk #1 designated as the treated Main is ended (step 1104), and the restoration for the disk #1 is completed.

5. Counter Scheme 5

In the counter scheme 5, similarly to the counter scheme 1, the rebuild process in FIG. 11 is triggered by a failure in each disk, and the triggering disk is designated as the treated Main.

When the second disk fails, similarly to the counter scheme 4, the current position in the first failing disk is set as the stop position in the second failing disk, the second failing disk is added as the treated Sub, and the rebuild process is continued. And at the same time, the rebuild process for the second failing disk designated as the treated Main is triggered to be executed in parallel with the rebuild process for the first failing disk designated as the treated Main.

Figure 18:
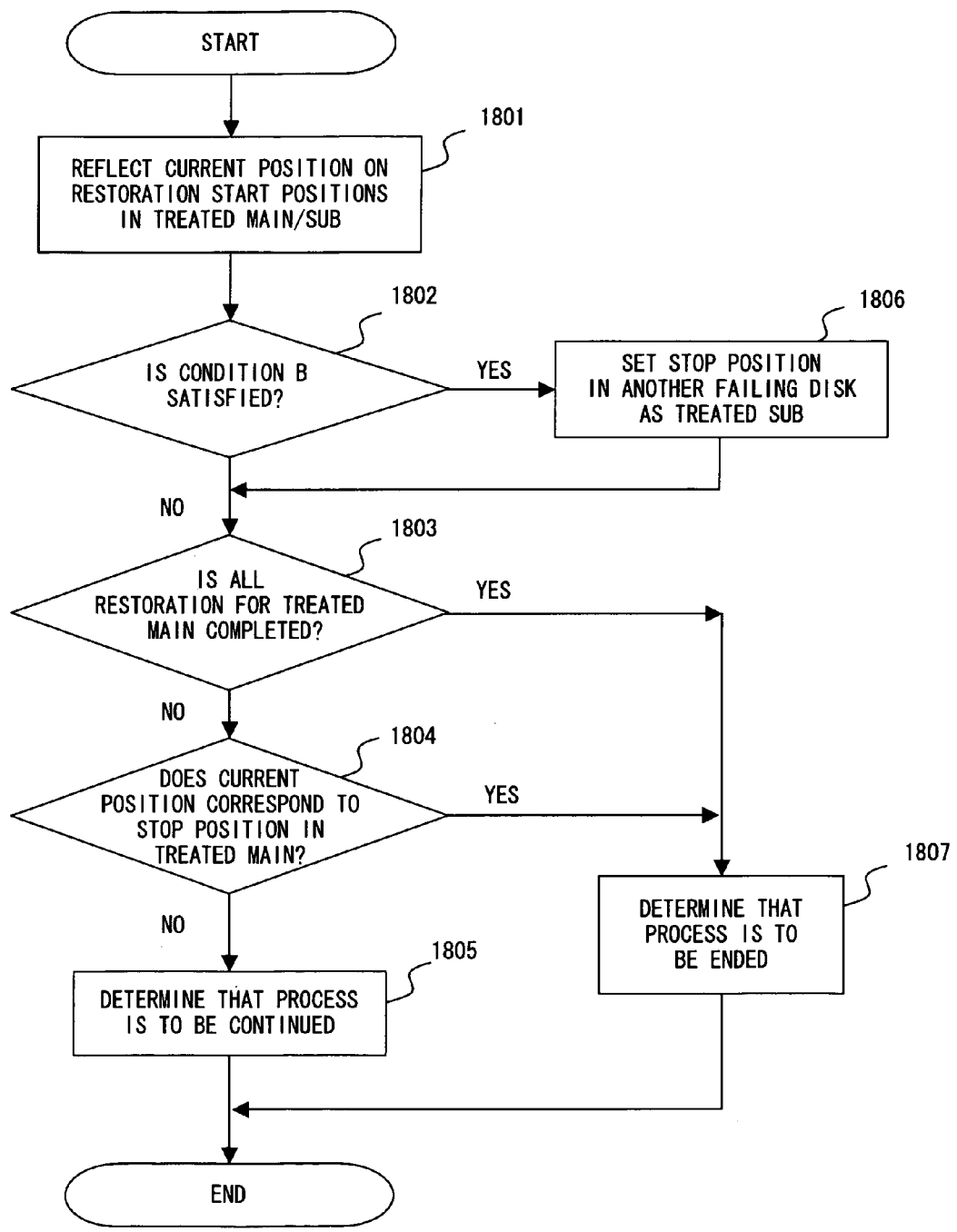
FIG. 18 is a flowchart of the process after restoration in the counter scheme 5.

The flowchart of the restoration routine in the counter scheme 5 is similar to that in the counter scheme 2, and the flowchart of the flowchart of the process after restoration is shown in FIG. 18. The process after restoration in FIG. 18 employs the configuration excluding the process of step 1707 from the process after restoration in FIG. 17.

When the disk #0 fails first as shown in FIG. 7 for example, the rebuild process for the disk #0 designated as the treated Main is triggered, and the process similar to that in the counter scheme 4 is executed until the disk #1 fails.

Next, when the disk #1 fails, the condition b is satisfied (step 1802), the restoration start position in the disk #0 is set to the stop position in the disk #1, and the disk #1 is added as the treated Sub (step 1806). However, because the stop position is not set in the disk #0 (step 1804), it is determined that the restoration process is to be continued (step 1805).

Upon this, the number of the restoration target disks becomes two (step 1401), so that the restoration method is switched into the rebuild process for the failures in two disks (step 1404), and the data/parity which is needed for restoring the data/parity in the disks #0 and #1 by the rebuild process for the failures in two disks is read from the normally operating disks #2 and #3 (step 1405). And the data/parity in the disks #0 and #1 is restored by using the read data/parity, and the restored data/parity is respectively written in the hot spares HS #0 and HS #1 (step 1407).

The current position in the disk #0 is set as the restoration start positions in the disk #0 and the disk #1 (step 1801), and the stop position is already set in the disk #1, accordingly, the condition b is not satisfied (step 1802). Also, because the stop position is not set in the disk #0 (step 1804), it is determined that the restoration process is to be continued (step 1805).

The restoration routine and the process after restoration as above are repeatedly executed for each one striping (step 1105), and when the restoration for the entire area in the disk #0 is completed (step 1803), it is determined that the restoration process is to be ended (step 1807). Thereby, the rebuild process for the disk #0 designated as the treated Main is ended (step 1104). At the above moment, the current position in the disk #1 designated as the treated Sub has reached the upper end of the disk #1.

Further, when the disk #1 fails, another rebuild process for the disk #1 designated as the treated Main is triggered, and the lower end of the disk #1 is set as the current position (step 1101). The rebuild process for the rebuild process for the failure in one disk is employed (step 1403) because the number of the restoration target disks is one (step 1401), and the data/parity which is needed for restoring the data/parity in the disk #1 by the rebuild process for the failure in one disk is read from the normally operating disks #0, #2 and #3 (step 1405). However, as for the disk #0, only restored data/parity which has been written in the hot spare HS #0 is read.

Then, the data/parity in the disk #1 is restored by using the read data/parity, and the restored data/parity is written in the hot spare HS#1 (step 1407).

The current position in the disk #1 is set as the restoration start position in the disk #1 (step 1801), and the stop position is already set in the disk #1, accordingly, the condition b is not satisfied (step 1802). Also, because the current position in the disk #1 has not reached the stop position in the disk #1 (step 1804), it is determined that the restoration process is to be continued (step 1805).

The restoration routine and the process after restoration as above are repeatedly executed for each one striping (step 1105), and the current position in the disk #1 reaches the stop position. At this moment, the current position in the disk #1 has not reached the upper end of the disk #1 so that it is determined that the restoration for the entire area is not completed (step 1803). However, the current position corresponds to the stop position (step 1804), it is determined that the restoration process is to be ended (step 1807). Thereby, the rebuild process for the disk #1 designated as the treated Main is ended (step 1104).

The rebuild process for the failures in two disks for the disk #0 designated as the treated Main and the rebuild process for the failure in one disk for the disk #1 designated as the treated Main are executed in parallel, and when both of the above processes are ended, the restoration for the disk #1 is completed.

6. Counter Scheme 6

In the rebuild processes in the counter schemes 1 to 5, a bitmap for indicating the restoration status for each prescribed area such as a strip, a logical block or the like in each disk is added as control information. The control of the progress for all the disks is conducted by one of the counter schemes 1 to 5.

Figure 19:
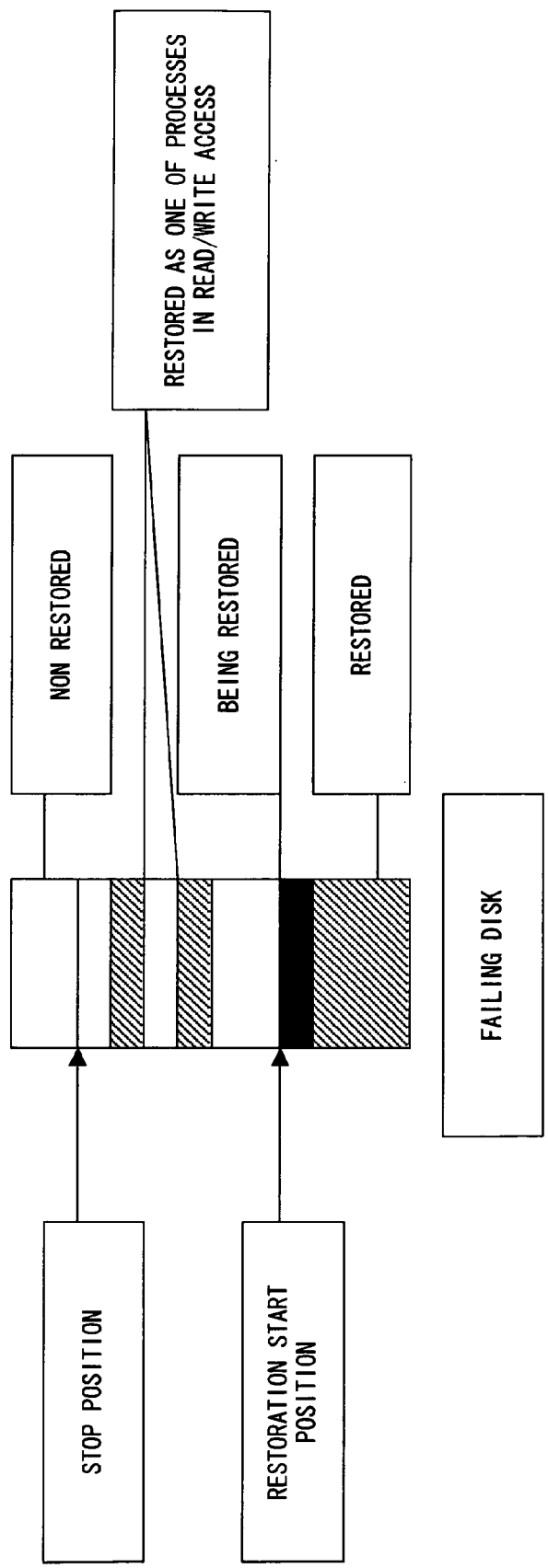
FIG. 19 shows restoration statuses in the counter scheme 6.

While the rebuild process or the restoration routine is executed, the controller 211 refers to the bit information corresponding to the restoration position in the bitmap. Then, as shown in FIG. 19, when there is an area which has already been restored as one of the processes in the read/write access or the like, the restoration for the restored area is skipped. Thereby, the unnecessary cost for the restoration process is reduced.

FIG. 20 shows a method of providing program and data to be used for the process by the processor 221 in the controller 211. The program and the data stored in an external device 1801 or a transportable storage medium 1802 such as an information processing device or the like is loaded to the memory 222 in the RAID device 202.

The external device 1801 generates carrier signals for carrying the program and the data, and transmits the program and the data to the RAID device 202 via an arbitrary transmission medium on a communications network. The transportable storage medium 1802 is an arbitrary computer readable storage medium such as a memory card, a flexible disk, an optical disk, a magneto optical disk or the like. The processor 221 executes the program by using the data in the storage medium, and executes required processes.

Figure 21:
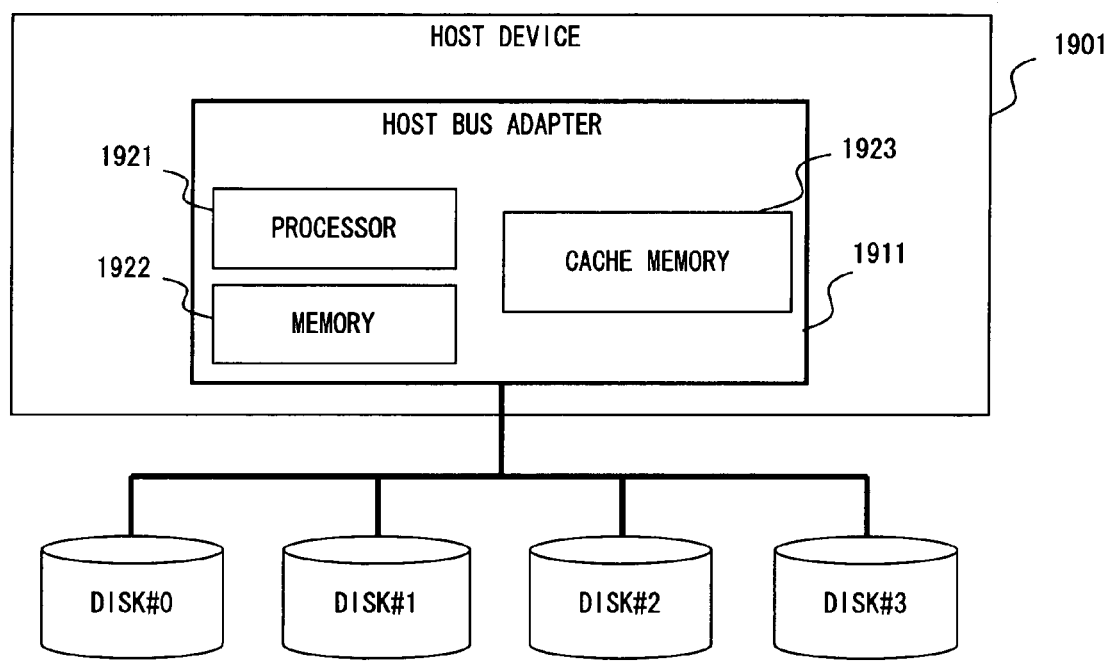
FIG. 21 shows a configuration of a second storage system.
Figure 22:
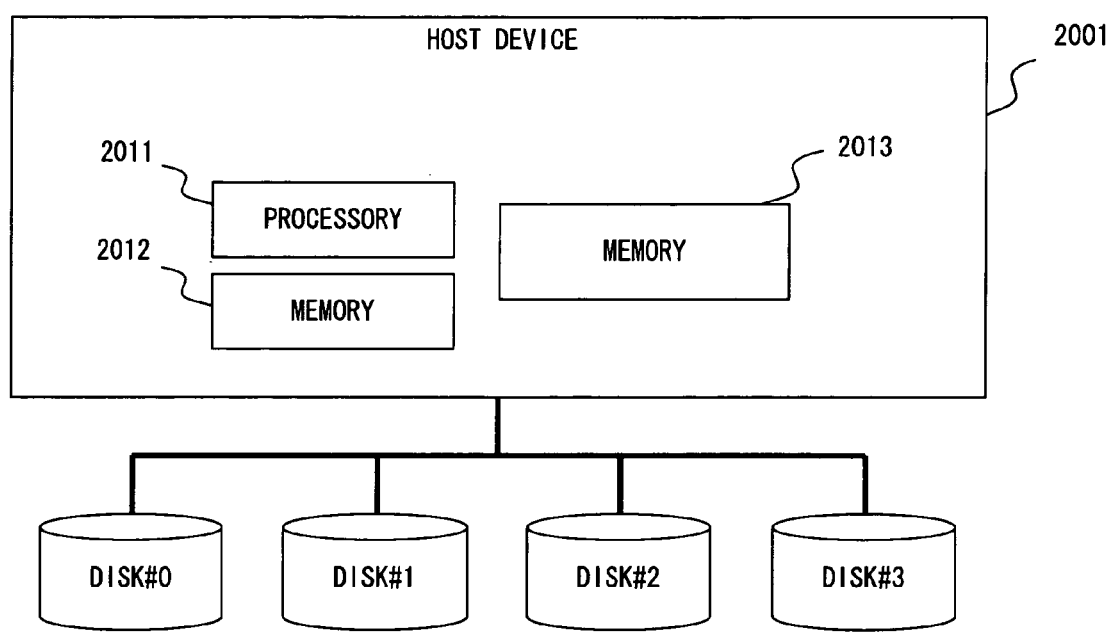
FIG. 22 shows a configuration of a third storage system.

FIG. 21 and FIG. 22 respectively show other configuration examples of the storage system. FIG. 21 shows an example in which a host bus adapter provided in the host device executes a rebuild process. FIG. 22 shows an example in which software provided in the host device executes a rebuild process. In both configurations, the necessary program and data are provided in the same manner as in the case of the RAID device 202.

The storage system in FIG. 21 comprises a host device 1901 and Disks #0 to #3. And the host device 1901 comprises a host bus adapter 1911. The host bus adapter 1911 comprises a processor 1921, memory 1922 and cache memory 1923, and executes a rebuild process for the case where the Disks #0 to #3 fail. Upon this, the processor 1921 executes a program stored in the memory 1922 and thereby, executes the above described rebuild process.

The storage system in FIG. 22 comprises a host device 2001 and Disks #0 to #3. And the host device 2001 comprises a processor 2011, memories 2012 and 2013, and executes a rebuild process for the case where the Disks #0 to #3 fail. Upon this, the processor 2011 executes a program stored in the memory 2012 and thereby, executes the above described rebuild process on the memory 2013.

In addition, in the above embodiments, a magnetic disk device is employed as a disk device, however, the present intention can be applied also to a storage system using other disk devices such as an optical disk device, a magneto optical disk device or the like, or other storage devices such as a tape device.

What is claimed is:

1. A storage control apparatus for realizing a redundancy of data by conducting a control by which data and parity are dispersively stored in a plurality of storage devices, comprising:

a processor, comprising;

a first rebuild unit for restoring information in a first storage device by using information stored in the storage devices other than the first storage device, and writing the restored information in a first spare storage device, when the first storage device among the plurality of the storage devices fails; and a second rebuild unit for restoring information in a non-restored area in the first storage device, wherein the restored information restored by the first rebuild unit is not written in a non-restored area in the first spare storage device corresponding to the non-restored area in the first storage device, and restoring information in a second storage device by using information stored in the storage devices other than the first and the second storage devices, and respectively writing the restored information in the non-restored area in the first spare storage device still holding the restored information restored by the first rebuild device and in a second spare storage device, when the second storage device fails while the information in the first storage device is being restored.

2. The storage control apparatus according to claim 1, wherein:

the second rebuild unit respectively executes a process for restoring information in the non-restored area in the first storage device and a process for restoring information in the second storage device independently and parallelly.

3. The storage control apparatus according to claim 1, wherein:

the second rebuild unit restores information in a corresponding area in the second storage device by using information in an area corresponding to the restored area in the first storage device stored in the storage devices other than the first and the second storage devices, and thereafter, restores information in the non-restored area in the first storage device and information in the corresponding area in the second storage device by using information in an area corresponding to the non-restored area in the first storage device stored in the storage devices other than the first and the second storage devices.

4. The storage control apparatus according to claim 1, wherein:

the second rebuild unit compares, with a threshold value, a difference between a restoration progress position in the first storage device and a restoration progress position in the second storage device, and respectively executes a process for restoring information in the non-restored area in the first storage device and a process for restoring information in the second storage device independently and parallelly when the difference between the restoration progress positions is equal to or greater than the threshold value, and restores information in a corresponding area in the second storage device by using information in an area corresponding to the restored area in the first storage device stored in the storage devices other than the first and the second storage devices, and thereafter, restores information in the non-restored area in the first storage device and information in the corresponding area in the second storage device by using information in an area corresponding to the non-restored area in the first storage device stored in the storage devices other than the first and the second storage devices when the difference between the restoration progress positions is smaller than the threshold value.

5. The storage control apparatus according to claim 1, wherein:
the second rebuild unit restores information in the non-restored area in the first storage device and information in the corresponding area in the second storage device by using information in the area corresponding to the non-restored area in the first storage device stored in the storage devices other than the first and the second storage devices, and thereafter, restores information in the corresponding area in the second storage device by using information in the area corresponding to the restored area in the first storage device stored in the storage devices other than the first and the second storage devices.

6. The storage control apparatus according to claim 1, wherein:
the second rebuild unit parallelly executes a process for restoring information in the corresponding area in the second storage device by using information in the area corresponding to the restored area in the first storage device stored in the storage devices other than the first and the second storage devices, and a process for restoring information in the non-restored area in the first storage device and information in the corresponding area in the second storage device by using information in the area corresponding to the non-restored area in the first storage device stored in the storage devices other than the first and the second storage devices.

7. The storage control apparatus according to one of claim 1 to claim 6, further comprising:
a holding device for holding bitmap information which indicates whether or not an area in the first and the second storage devices is restored for each prescribed area, wherein:
the second rebuild unit restores information in areas other than the restored area by referring to the bitmap information.

8. The storage control apparatus according to claim 7, wherein:
the second rebuild unit restores information as an access target, and records, in the position corresponding to the information as the access target in the bitmap information, the information indicating that the corresponding area is restored, when an access request to the first or the second storage devices occurs.

9. A computer readable recording medium which records a program for a processor realizing a redundancy of data by conducting a control by which data and parity are dispersively stored in a plurality of storage devices, causing the processor to execute:
a process of restoring information in a first storage device by using information stored in the storage devices other than the first storage device, and writing the restored information in a first spare storage device, when the first storage device among the plurality of the storage devices fails; and
a process of restoring information in a non-restored area in the first storage device wherein the restored information restored by the process of restoring information in the first storage device is not written in a non-restored area in the first spare storage device corresponding to the non-restored area in the first storage device, and restoring information in a second storage device by using information stored in storage devices other than the first and the second storage devices, and respectively writing the restored information in a corresponding area in the first spare storage device still holding the restored information restored by the first rebuild device and in a second spare storage device, when the second storage device fails while the information in the first storage device is being restored.

10. The storage control apparatus according to claim 1, further comprising:
a memory device having a restoration start position which indicates a current position of the restoration of the first spare storage device and a restoration stop position which indicates restoring stop position of the second spare storage device, and
wherein the second rebuild unit sets the restoration stop position based on the restoration start position, when the second storage device fails.

11. A method, comprising:
restoring information in a first storage device using information stored in storage devices other than the first storage device, and writing the restored information in a first spare storage device, when the first storage device fails; and
restoring information in a non-restored area in the first storage device wherein the restored information restored by the process of restoring information in the first storage device is not written in a non-restored area in the first spare storage device corresponding to the non-restored area in the first storage device and restoring information in a second storage device using information stored in storage devices other than the first and the second storage devices, and respectively writing the restored information in a corresponding area in the first spare storage device still holding the restored information restored by the first rebuild device and in a second spare storage device, when the second storage device fails while the information in the first storage device is being restored.

* * * * *